US012566750B2

(12) United States Patent
Koploy

(10) Patent No.:    US 12,566,750 B2
(45) Date of Patent:         Mar. 3, 2026

(54) SYSTEMS AND METHODS OF FACILITATING AN INFORMED CONSENSUS-DRIVEN DISCUSSION

(71) Applicant: Randolph A. Koploy, Lakewood, CO (US)

(72) Inventor: Randolph A. Koploy, Lakewood, CO (US)

( * ) Notice: Subject to any disclaimer, the term of this patent is extended or adjusted under 35 U.S.C. 154(b) by 0 days.

(21) Appl. No.: 19/183,464

(22) Filed: Apr. 18, 2025

(65)                Prior Publication Data

US 2025/0328519 A1      Oct. 23, 2025

Related U.S. Application Data

(60) Provisional application No. 63/636,030, filed on Apr. 18, 2024.

(51) Int. Cl.
*G06F 16/00*          (2019.01)
*G06F 16/22*          (2019.01)
                  (Continued)
(52) U.S. Cl.
CPC ...... *G06F 16/2365* (2019.01); *G06F 16/2246* (2019.01); *G06F 16/285* (2019.01)
(58) Field of Classification Search
CPC .... G06F 40/30; G06F 16/285; G06F 16/3329; G06F 40/20; G06F 40/40; G06F 16/2237; G06F 16/248; G06F 16/322; G06F 16/328; G06F 16/3323; G06F 16/3338; G06F 16/3344; G06F 16/3347; G06F 16/345; G06F 16/367; G06F 16/90332; G06F 40/289; G06F 9/451; G06F 9/453;

G06F 9/547; G06F 16/243; G06F 16/288; G06F 16/9027; G06F 16/906; G06F 16/951; G06F 40/247; G06F 40/295; G06F 40/35; G06F 1/00; G06F 3/00; G06F 5/00; G06F 7/00; G06F 8/00; G06F 9/00; G06F 11/00;
(Continued)

(56)                References Cited

U.S. PATENT DOCUMENTS 7,991,764 B2    8/2011    Rathod
9,015,037 B2    4/2015    Myslinski
                (Continued)

FOREIGN PATENT DOCUMENTS

WO        2020061578 A1      3/2020

*Primary Examiner* — Shyue Jiunn Hwa

(57)                ABSTRACT

The present disclosure provides a method of facilitating a consensus-driven discussion. Further, the method may include receiving, using a communication device, a discussion data. Further, the discussion data corresponds to a topic of a discussion. Further, the method may include receiving, using the communication device, two or more user role data. Further, the method may include obtaining, using a processing device, a resource data based on the discussion data. Further, the method may include determining, using the processing device, a service data based on the discussion data. Further, the method may include generating, using the processing device, a network data based on each of the two or more user data, the resource data, and the service data. Further, the network data corresponds to a hierarchical network aggregating each of the two or more users, the resource and the service and representing a hierarchical significance of the two or more users.

18 Claims, 19 Drawing Sheets

(51) Int. Cl.
   *G06F 16/23*          (2019.01)
   *G06F 16/28*          (2019.01)
(58) Field of Classification Search
   CPC .......... G06F 12/00; G06F 13/00; G06F 15/00;
                 G06F 16/00; G06F 17/00; G06F 18/00;
                 G06F 21/00; G06F 30/00; G06F 40/00;
                 G06F 16/9536; G06F 16/14; G06F
                 16/156; G06F 16/24578; G06F 16/40;
                 G06F 16/93; G06F 16/9535; G06F
                 16/986; G06F 40/205; G06F 15/173;
                 G06F 40/253; G06F 16/176; G06F 16/48;
                 G06Q 50/01; G06Q 10/10; G06Q
                 30/0201; G06Q 30/02; G06Q 10/0633;
                 G06Q 30/0601; G06Q 40/04; H04L
                 51/52; H04L 51/212; H04L 67/02; H04L
                 67/306; G06N 3/08; G06N 3/044; B64U
                                                      20/10
   See application file for complete search history.

(56)                    References Cited

U.S. PATENT DOCUMENTS 10,169,424  B2      1/2019  Motte et al.
 2004/0122846  A1      6/2004  Chess et al.
 2010/0205541  A1*     8/2010  Rapaport .............. G06Q 30/02
                                                          715/753
 2020/0265070  A1*     8/2020  Rapaport .............. G06Q 10/10
 2021/0294828  A1*     9/2021  Tomkins .............. G10L 15/063

* cited by examiner

100

112

DISCUSSION DATA
PLURALITY OF USER ROLE
  DATA
RESULT DATA
TRAINING DATA
CONFLICT RESULT DATA

106

104

102

200

110

104

104

114

104

116

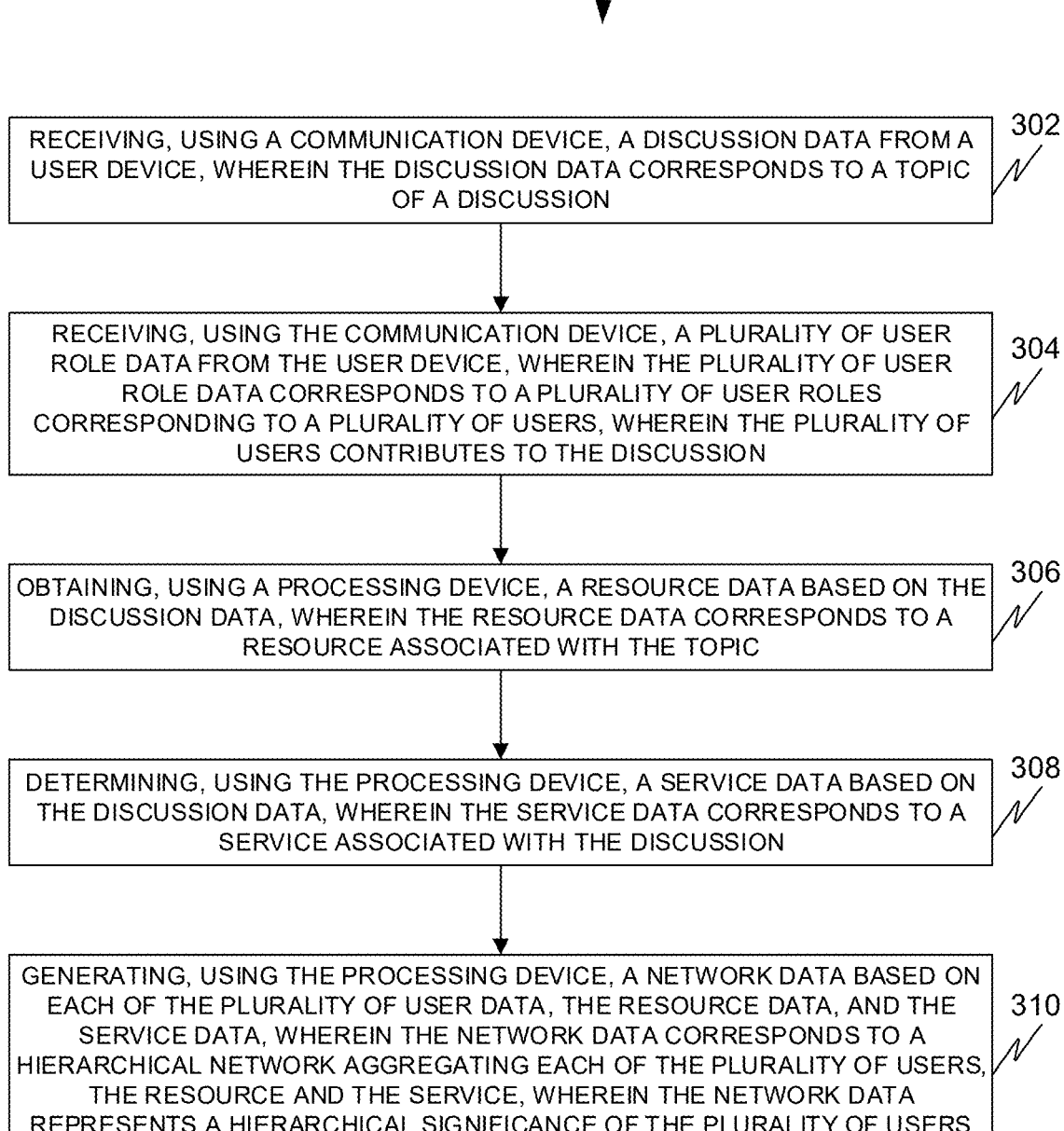

300

RECEIVING, USING A COMMUNICATION DEVICE, A DISCUSSION DATA FROM A USER DEVICE, WHEREIN THE DISCUSSION DATA CORRESPONDS TO A TOPIC OF A DISCUSSION                                                                302

RECEIVING, USING THE COMMUNICATION DEVICE, A PLURALITY OF USER ROLE DATA FROM THE USER DEVICE, WHEREIN THE PLURALITY OF USER ROLE DATA CORRESPONDS TO A PLURALITY OF USER ROLES CORRESPONDING TO A PLURALITY OF USERS, WHEREIN THE PLURALITY OF USERS CONTRIBUTES TO THE DISCUSSION                          304

OBTAINING, USING A PROCESSING DEVICE, A RESOURCE DATA BASED ON THE DISCUSSION DATA, WHEREIN THE RESOURCE DATA CORRESPONDS TO A RESOURCE ASSOCIATED WITH THE TOPIC                                             306

DETERMINING, USING THE PROCESSING DEVICE, A SERVICE DATA BASED ON THE DISCUSSION DATA, WHEREIN THE SERVICE DATA CORRESPONDS TO A SERVICE ASSOCIATED WITH THE DISCUSSION                                       308

GENERATING, USING THE PROCESSING DEVICE, A NETWORK DATA BASED ON EACH OF THE PLURALITY OF USER DATA, THE RESOURCE DATA, AND THE SERVICE DATA, WHEREIN THE NETWORK DATA CORRESPONDS TO A HIERARCHICAL NETWORK AGGREGATING EACH OF THE PLURALITY OF USERS, THE RESOURCE AND THE SERVICE, WHEREIN THE NETWORK DATA REPRESENTS A HIERARCHICAL SIGNIFICANCE OF THE PLURALITY OF USERS                          310

STORING, USING THE PROCESSING DEVICE, THE NETWORK DATA IN A
DATABASE

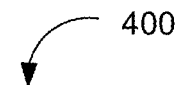
400
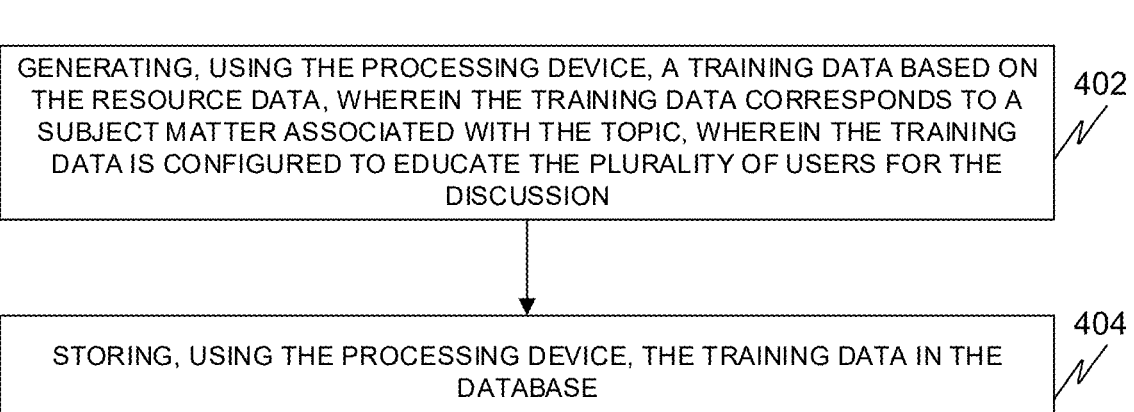
GENERATING, USING THE PROCESSING DEVICE, A TRAINING DATA BASED ON THE RESOURCE DATA, WHEREIN THE TRAINING DATA CORRESPONDS TO A SUBJECT MATTER ASSOCIATED WITH THE TOPIC, WHEREIN THE TRAINING DATA IS CONFIGURED TO EDUCATE THE PLURALITY OF USERS FOR THE DISCUSSION
402
STORING, USING THE PROCESSING DEVICE, THE TRAINING DATA IN THE DATABASE
404
Fig. 4

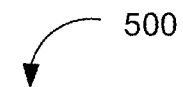

500

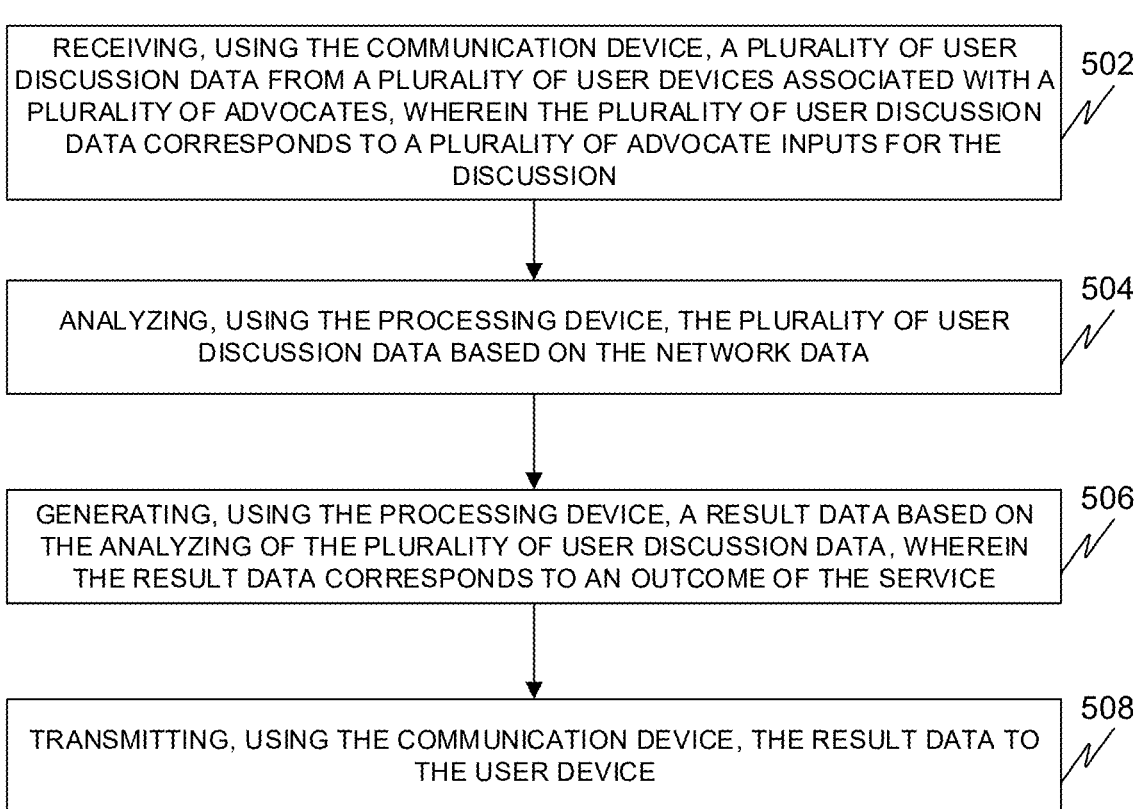

RECEIVING, USING THE COMMUNICATION DEVICE, A PLURALITY OF USER DISCUSSION DATA FROM A PLURALITY OF USER DEVICES ASSOCIATED WITH A PLURALITY OF ADVOCATES, WHEREIN THE PLURALITY OF USER DISCUSSION DATA CORRESPONDS TO A PLURALITY OF ADVOCATE INPUTS FOR THE DISCUSSION

502

ANALYZING, USING THE PROCESSING DEVICE, THE PLURALITY OF USER DISCUSSION DATA BASED ON THE NETWORK DATA

504

GENERATING, USING THE PROCESSING DEVICE, A RESULT DATA BASED ON THE ANALYZING OF THE PLURALITY OF USER DISCUSSION DATA, WHEREIN THE RESULT DATA CORRESPONDS TO AN OUTCOME OF THE SERVICE

506

TRANSMITTING, USING THE COMMUNICATION DEVICE, THE RESULT DATA TO THE USER DEVICE

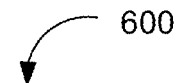

GENERATING, USING THE PROCESSING DEVICE, A RESOURCE LIBRARY DATA BASED ON THE RESOURCE DATA, WHEREIN THE RESOURCE LIBRARY DATA CORRESPONDS TO A REPOSITORY OF A PLURALITY OF FACTS IN RELATION TO A TOPIC OF DISCUSSION, WHEREIN THE RESOURCE LIBRARY DATA FURTHER COMPRISES A UNIQUE IDENTIFIER ASSOCIATED WITH A SOURCE OF EACH OF THE PLURALITY OF FACTS        602

STORING, USING THE PROCESSING DEVICE, THE RESOURCE LIBRARY DATA IN THE DATABASE        604

Fig. 6

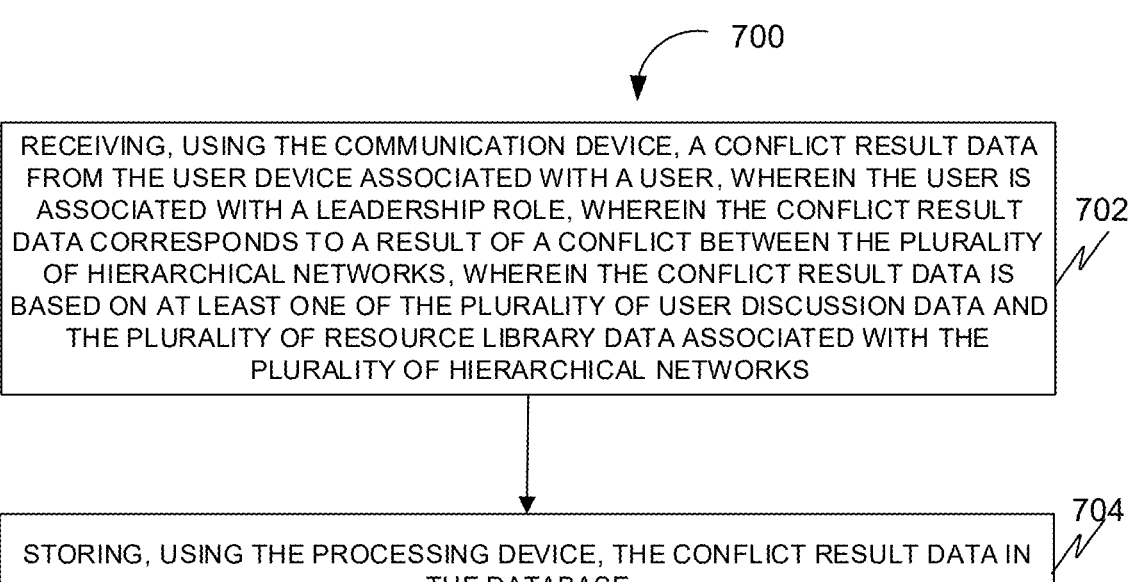

700

RECEIVING, USING THE COMMUNICATION DEVICE, A CONFLICT RESULT DATA FROM THE USER DEVICE ASSOCIATED WITH A USER, WHEREIN THE USER IS ASSOCIATED WITH A LEADERSHIP ROLE, WHEREIN THE CONFLICT RESULT DATA CORRESPONDS TO A RESULT OF A CONFLICT BETWEEN THE PLURALITY OF HIERARCHICAL NETWORKS, WHEREIN THE CONFLICT RESULT DATA IS BASED ON AT LEAST ONE OF THE PLURALITY OF USER DISCUSSION DATA AND THE PLURALITY OF RESOURCE LIBRARY DATA ASSOCIATED WITH THE PLURALITY OF HIERARCHICAL NETWORKS

702

STORING, USING THE PROCESSING DEVICE, THE CONFLICT RESULT DATA IN THE DATABASE

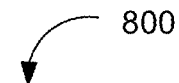
800
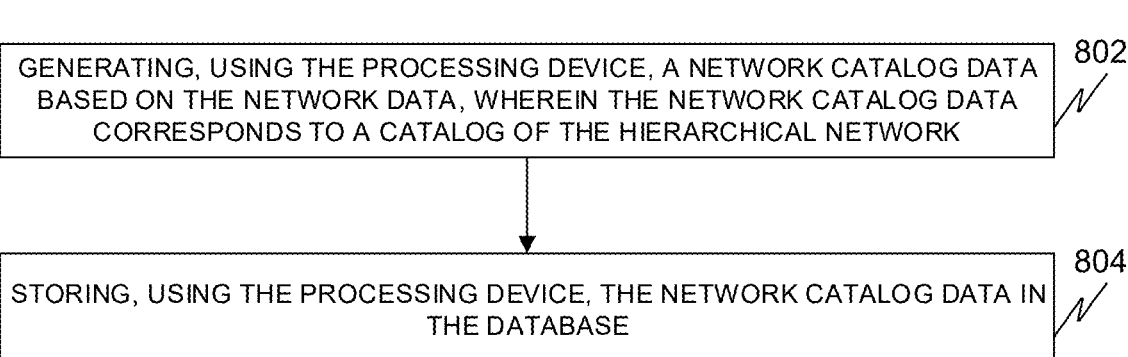
GENERATING, USING THE PROCESSING DEVICE, A NETWORK CATALOG DATA BASED ON THE NETWORK DATA, WHEREIN THE NETWORK CATALOG DATA CORRESPONDS TO A CATALOG OF THE HIERARCHICAL NETWORK     802
STORING, USING THE PROCESSING DEVICE, THE NETWORK CATALOG DATA IN THE DATABASE     804
Fig. 8

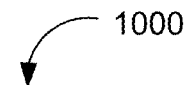

1000

| RETRIEVING, USING THE PROCESSING DEVICE, AT LEAST ONE OF THE PLURALITY OF USER DISCUSSION DATA AND THE PLURALITY OF RESOURCE LIBRARY DATA |
|---|

1002

| TRANSMITTING, USING THE COMMUNCIATION DEVICE, AT LEAST ONE OF THE PLURALITY OF USER DISCUSSION DATA AND THE PLURALITY OF RESOURCE LIBRARY DATA TO THE USER DEVICE, WHEREIN THE CONFLICT RESPONSE DATA IS BASED ON AT LEAST ONE OF THE PLURALITY OF USER DISCUSSION DATA AND THE PLURALITY OF RESOURCE LIBRARY DATA |
|---|

| GENERATING, USING THE PROCESSING DEVICE, A MODIFIED RESOURCE DATA BASED ON THE PLURALITY OF ADVOCATE INPUTS, WHEREIN THE MODIFIED RESOURCE DATA CORRESPONDS TO A REFINED DIGITAL LIBRARY COMPRISING A REFINED-STRUCTURED DETAIL | 1102 |

| STORING, USING THE PROCESSING DEVICE, THE MODIFIED LIBRARY DATA IN THE DATABASE | 1104 |

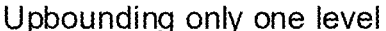
Upbounding only one level
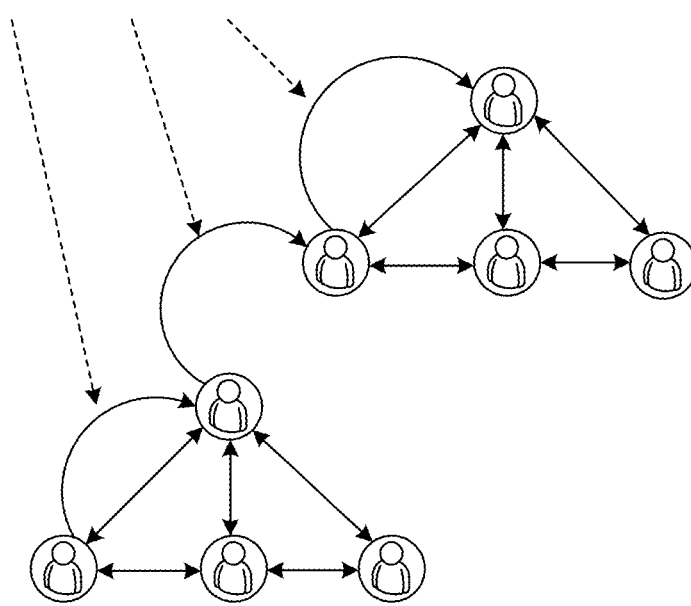
Fig. 18

SYSTEMS AND METHODS OF FACILITATING AN INFORMED CONSENSUS-DRIVEN DISCUSSION

FIELD OF DISCLOSURE

The present disclosure generally relates to a field of data processing. More specifically, the present disclosure related to systems and methods of facilitating an informed consensus-driven discussion.

BACKGROUND

The field of information processing and networked systems lies at the core of modern technological advancements, driving innovation across industries such as business, healthcare, education, and more. Efficient management and organization of data are critical to enabling informed decision-making, fostering collaboration, and supporting scalable operations in dynamic environments.

Social media networks have vast numbers of users. In general users are free to select and follow one another. Various user controls such as follow, reply, re-send, block, mute etc. are available to allow the strengthening or diminishing of users' desired network links. However, networks of users tend to become randomly interconnected and systematically siloed. The exception to this rule is that "favored" users become heavy broadcast nodes. This gives the "favored" user the potential of developing an extraordinary reach for broadcasting his perspective. However, it is important to note that a "favored" users' broadcasts often provokes a massive numbers of replies. This greatly diminishes the likelihood that any individual user's reply will be noticed. For this reason, a meaningful discussion with an authoritative ("favored") user is highly unlikely. In addition, most user discussions take place among users of similar opinion. Since there is essentially no dialog with a "favored-subject expert" and no common accepted "fact base", consensus develops via a process akin to a siloed-rumor mill.

As organizations increasingly rely on vast amounts of data to drive performance and innovation, the need for robust systems that can effectively aggregate, prioritize, and manage information has become paramount. The ability to process and synthesize data from multiple sources, in real-time, is essential for meeting the demands of modern applications. However, existing methods often fall short in a capacity to deliver such functionality efficiently or effectively.

A key challenge in this field is the lack of structured frameworks for information processing, which can lead to disorganization and inefficiency. Traditional systems may struggle with scalability, particularly when dealing with large volumes of data or multiple stakeholders, leading to delays in decision-making and reduced overall performance. Additionally, existing solutions may fail to address the complexity of dynamically changing environments, where information must be processed and delivered swiftly to support timely actions.

Moreover, the integration of diverse information sources often leads to inconsistencies and conflicts, which can hinder trust in the system and complicate decision-making processes. Existing systems may lack the ability to handle real-time data streams, leading to delays in critical information delivery.

Therefore, there is a need for improved systems and methods of facilitating an informed consensus-driven discussion, that can overcome one or more of the preceding problems.

SUMMARY OF DISCLOSURE

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

The present disclosure provides a method of facilitating an informed consensus-driven discussion. Further, the method may include receiving, using a communication device, a discussion data from a user device. Further, the discussion data corresponds to a topic of a discussion. Further, the method may include receiving, using the communication device, two or more user role data from the user device. Further, the two or more user role data corresponds to two or more user roles corresponding to two or more users. Further, the two or more users contributes to the discussion. Further, the method may include obtaining, using a processing device, a resource data based on the discussion data. Further, the resource data corresponds to a resource associated with the topic. Further, the method may include determining, using the processing device, a service data based on the discussion data. Further, the service data corresponds to a service associated with the discussion. Further, the method may include generating, using the processing device, a network data based on each of the two or more user data, the resource data, and the service data. Further, the network data corresponds to a hierarchical network aggregating each of the two or more users, the resource and the service. Further, the network data represents a hierarchical significance of the two or more users. Further, the method may include storing, using the processing device, the network data in a database.

The present disclosure provides a system of facilitating an informed consensus-driven discussion. Further, the system may include a communication device. Further, the communication device may be configured for receiving a discussion data from a user device. Further, the discussion data corresponds to a topic of a discussion. Further, the communication device may be configured for receiving two or more user role data from the user device. Further, the two or more user role data corresponds to two or more user roles corresponding to two or more users. Further, the two or more users contributes to the discussion. Further, the system may include a processing device communicatively coupled with the communication device. Further, the processing device may be configured for obtaining a resource data based on the discussion data. Further, the resource data corresponds to a resource associated with the topic. Further, the processing device may be configured for determining a service data based on the discussion data. Further, the service data corresponds to a service associated with the discussion. Further, the processing device may be configured for generating a network data based on each of the two or more user data, the resource data, and the service data. Further, the network data corresponds to a hierarchical network aggregating each of the two or more users, the resource and the service. Further, the network data represents a hierarchical significance of the two or more users. Further, the processing device may be configured for storing the network data in a database.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTIONS OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 3A illustrates a flowchart of a method 300 of facilitating an informed consensus-driven discussion, in accordance with some embodiments.

FIG. 4 illustrates a flowchart of a method 400 of facilitating an informed consensus-driven discussion including generating, using the processing device 904, a training data, in accordance with some embodiments.

FIG. 5 illustrates a flowchart of a method 500 of facilitating an informed consensus-driven discussion including generating, using the processing device 904, a result data, in accordance with some embodiments.

FIG. 6 illustrates a flowchart of a method 600 of facilitating an informed consensus-driven discussion including generating, using the processing device 904, a resource library data, in accordance with some embodiments.

FIG. 7 illustrates a flowchart of a method 700 of facilitating an informed consensus-driven discussion including storing, using the processing device 904, the conflict result data, in accordance with some embodiments.

FIG. 8 illustrates a flowchart of a method 800 of facilitating an informed consensus-driven discussion including generating, using the processing device 904, a network catalog data, in accordance with some embodiments.

FIG. 10 illustrates a flowchart of a method 1000 of facilitating an informed consensus-driven discussion including retrieving, using the processing device 904, at least one of the two or more of user discussion data and the two or more of the resource library data, in accordance with some embodiments.

FIG. 18 illustrates a flow of user discussion data in an advocate layer, in accordance with some embodiments.

DETAILED DESCRIPTION OF DISCLOSURE

Figure 1:
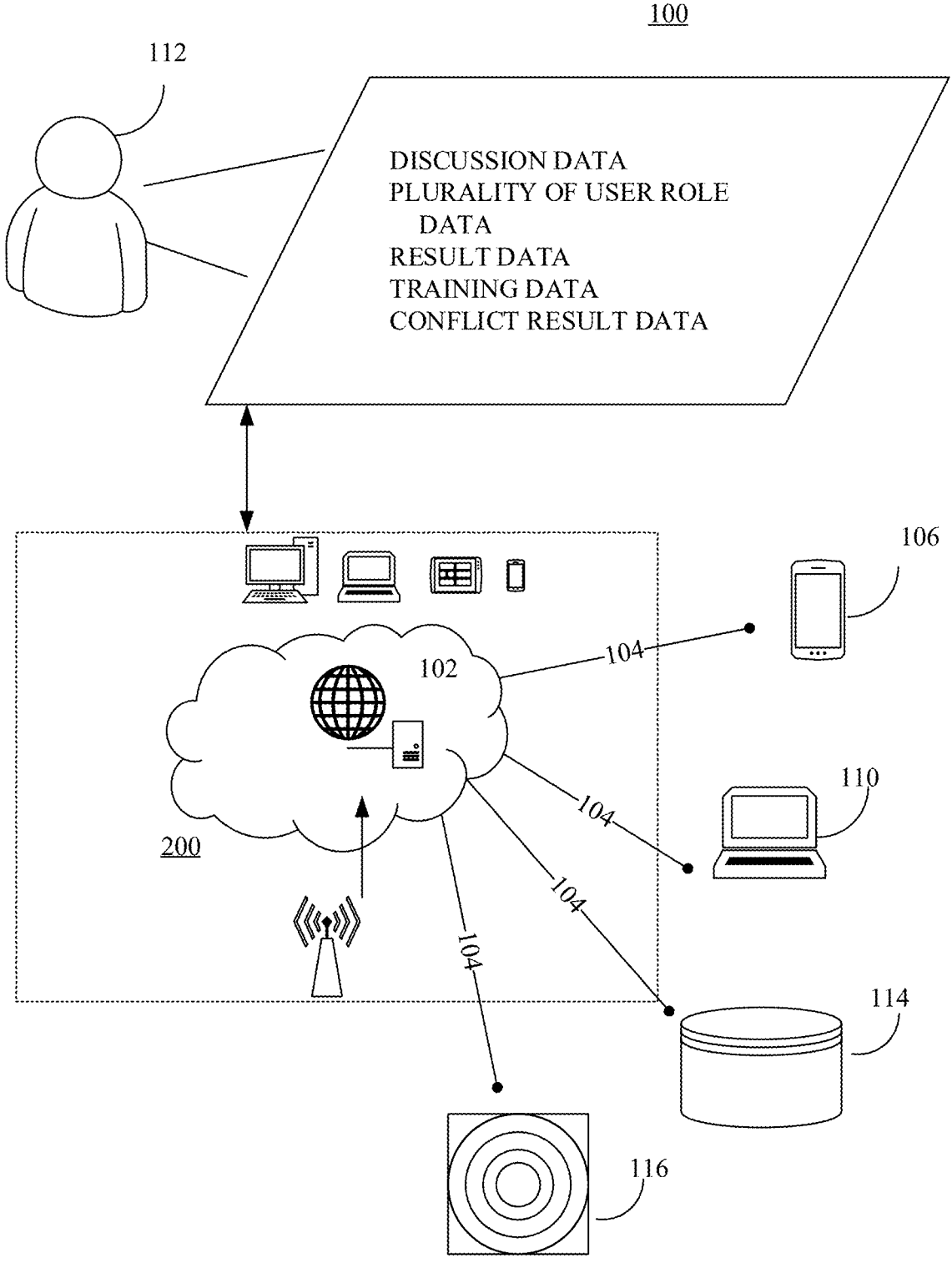
FIG. 1 is an illustration of an online platform 100 consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of the disclosed use cases, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data there between corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview

The present disclosure describes the design for a major evolutionary change to social media, designed to reignite informed free speech and dialog. Further, the design is named as SoCortex pyramid. Further, the present disclosure describes a system that creates and maintains structured networks of users, groups, and resources within a "structural-informed-discussion-moderator" (termed "Pyramids"). This allows for the aggregation of premises, assertions, facts, opinions and qualified references with their associated specific users and groups. The user's and group's information exchange will be constrained by the architecture to maximize the utility and effectiveness of communications.

A primary goal of the system is to strengthen credible, informed dialog within social media thus limiting the "rumor mill".

Further, the present disclosure describes a software system (and method) designed to be a plugin for pre-existing social media platforms. The system executes within the social media host software environment and with handheld interface to create virtual user participation centers called "pyramids". Each "pyramid" of the system accommodates an essentially unlimited number of users. A "pyramid" is a user driven processing and transmitting center for education, premise support, opinion, perspective, and decision. Pyramid participants (called advocates) interact, recruit, and educate other potential advocates drawn from the social media host's user base. Pyramids ultimately conference virtually (or physically) and seek to create reach consensus on various items represented by poll results.

The Social media's basic structure is unchanged. It continues to source news, raise issues, and "bring the heat". As issues boil to the surface, social media users (advocates) will organically form and join SoCortex pyramids. Since there are many issues and perspectives there will also be many pyramids. Leadership, editorialists, and educators, (instead of the "favored" user), are dedicated to supporting each pyramid's perspective.

The SoCortex pyramid draws its members from its host social media but it avoids the "random network pitfall" by creating a "layered user structure" that acts as an "informed discussion moderator". The SoCortex is a software plugin that uses a social media platform as its host. It could be classified as a plugin, app, or an API. The actual classification of the software entity is to be decided, because the specifics of the Socortex's operating environment will be diverse. For maximum societal benefit SoCortex should be as widely available as possible. There are several social media services currently available. For a maximal deployment something like a standard plugin interface could be developed. Open code (with maximal transparency) and/or licensing, proprietary etc. are all options. SoCortex roll out will determine the specifics of whether it is open sourced, licensed or a standalone product. It will find applications on the desktop, portable devices and across many modern social interfaces. Further, the SoCortex corresponds to a virtual social brain forming a social intelligence. Further, the humans are neurons of the virtual social brain.

The SoCortex is a virtual structure (not physical). It is composed of many repeating participation centers called "pyramids" (also, virtual). Each pyramid is a processing and transmitting center for a premise, opinion, perspective, or decision. Its activities are powered by its supporting leadership, staff, and advocates. In service of these objectives, it also supports a secure hyperlinked library. The hyperlinks of the library base begin with the base perspective (premise) and from there branch out into the World of information.

Pyramid advocates and leadership base their operations on its secure library. Iteratively learning, adding to and correcting the library fact base. By this method a pyramid develops a detailed consensus that is output as Detailed poll. Pyramids with conflicting perspectives conference and debate in virtual conference's (inter-pyramid review and resolution).

The SoCortex pyramid draws its members from its host social media but it avoids the random network pitfall by creating a "layered user structure" that acts as an "informed discussion moderator".

Discussions are brought to focus by pyramid editorials that drive the secure library fact base Ongoing news, editorials and opinions get checked against the fact base eliminating unsupported news, claims and "facts"

Advocates converse with fellow advocates, users and peers utilizing the context of the secure library Over time their conversations will bring in further understanding, breaking news and facts. These dynamics will further develop the contents of the library.

Advocates and their recruits will benefit from self-paced learning via the secure library.

Advocates need and deserve rational informed dialog. But since all membership/advocates are involved in an issue/perspective learning process, dialog should be tailored to their immediate need and readiness. Since dialog demands tailoring and bandwidth it should be personalized and distributed.

Further, since, on average, new membership will start with limited perspective knowledge and a limited commitment to the perspective and since earlier committed, trained membership is limited in number (and better informed), the pyramid, layered-user-structure makes sense.

A nearly unlimited multiplicity of pyramids can be created thus allowing inter-pyramid contention resolution (the equivalent of dialog and debate). The nature and degree of consensus will be summarized by parametrized poll outputs. When the software is interfaced to a social media, the currently chaotic conversational system can be transformed into rational, informed dialog.

Social media continues to bring the news, raise issues and, "bring the heat". As issues boil to the surface, social media users (advocates) will organically form and join the present invention's pyramids. Since there are many issues and perspectives there will also be many pyramids.

The system works using the idea that social media creates random networks of users. These random networks generally lead to dysfunctional communication among members; the system is intended to combat dysfunctionality by creating user participation centers (pyramids) via programmable network weighting and switching for the purpose of building a "layered network user structure" that acts as an "informed discussion moderator".

The design consists of the following:
1. The pyramid gateway which is the plugin interface and security firewall for the social media host
2. The pyramid network manager which utilizes a network database, is responsible for maintaining the proper interconnectivity of the pyramid participants and services, thus maintaining its hierarchical structure. To this purpose it distributes intelligent packets to/from selected and allowed pyramid sources and destinations.
3. Sources and destinations are the pyramid participants and pyramid services. The pyramid participants can be broken down into social media host leadership, staff, "advocates", and general users. The pyramid services can be broken down into intra-pyramid services, inter-pyramid services, polling, libraries, network status, event management, and financial management. This list comprises the ideal form of the system, but additional participants and services may be possible, and not all participants and services are required to maintain the scope and spirit of the system.

Further, the pyramid structure of the system is conceptual for understanding how it is designed and used, in reality it is a multipoint, packetized or inter-process communication network that maps services and participants into a weighted/structured network. This aspect is a major focus of the system as it is the networking infrastructure for the virtual pyramid structure.

Further, the flow of discussion from a social media advocate follows a criterion for upward communication. Further, the criterion may correspond to a one level upbound based on a weighting in the hierarchical network. Further, the criterion facilitates an advocate training based on the library content. Further, the criterion facilitates an accessing of the library content.

Further, the ideal structure each pyramid instance is intended to have unique database entries but identical structures. Further, the system is used to rank and arrange nodes for effective flow of information. Further, the pyramids may have individualized controls that allow for enhancement of their purpose. Overtime evolution of the environment will occur (updates or new versions via the licensing directorate)

Further, the system's pyramid services include the generation of a pyramid "catalog". The catalog is hierarchical, allowing connected host social media users, members and advocates to quickly search for pyramid issues and perspectives of interest. Further, quick search includes a parametrized search. This will allow users to find and join pyramids of their choice. Social media users may also casually visit pyramid libraries of their choosing (with limited privileges).

Further, the pyramid is a multipoint, packetized, or inter-process communication network that maps services and participants into a weighted/structured network. This process creates an enhanced prioritized problem resolution system. Further, the pyramids can be spawned by the system, nearly without limit, allowing for simultaneous actions on a great multitude of issues. The interactions of the pyramids and their participants lead to an "Intelligent" problem resolution system with a parametric poll consensus output (polls can represent a pyramid or groups of pyramids) (poll output organization and tabulation via parameter selection can be controlled by the end customer. The selection process does not affect the poll database but only adjusts the particular output).

Further, each pyramid of the system is designed as a user driven processing and transmitting center for items including, but not limited to, education, premise support, opinion, perspective, and decision.

Further, each pyramid of the system supports a secure hyperlinked Library that archives its membership's fact base. The system's libraries house the facts/opinions that support each pyramid's premise. These libraries are secured by being only modifiable by the pyramid leadership and has a secure hyperlink traceable history. The hyperlinks of the library fact base are rooted at the base perspective. The hyperlinks extend their branches out into the world of information thus establishing their basis to whatever extent is practical.

Further, the pyramid leadership activities mainly involve advocate training and recruitment, improving the secure library, and updating editorials. Since the libraries are universally accessible, they are one of the most important pyramid "products". During a pyramid's "operational phase" members/advocates use the library to engage in iterative self-paced learning and dialog. In addition, facts are added, removed, updated, and corrected further refining the secure library fact base (modifications are only allowed by leadership and a change history must be preserved). By this method a pyramid is intended to develop a fact-based consensus that is eventually output as detailed poll (this is also a product). Pyramids with conflicting perspectives can then conference and debate in virtual conferences which functions as the inter-pyramid review and resolution aspect of the system. This "conference period" in turn outputs an inter-pyramid consensus detailed poll that represents the best efforts of all relevant pyramids to achieve consensus.

Under the system's intended structure, it is expected that significant time and effort will be required by the hosting social media, pyramid leadership, staff, advocates, and legacy media sources. Secure hyperlink supported media sources will also be required. Compensation via free market interchange (micro-subscriptions) will support and drive the activity of the SoCortex and its social allies.

Further, the pyramid leadership includes:

1. Pyramid leader (CEO)
   Knowledgeable strong supporter (advocate of the perspective and its narrative). Public facing, PR head, works closely with the Policy owner. Coordinates and negotiates with related pyramids. Responsible for conferencing and library issues.
2. Policy owner (President)
   Knowledgeable strong supporter (advocate of the perspective and its narrative). Strongly tied to Pyramid leader. Managing the details of the pyramid operations. Pyramid Leader/Policy owner task sharing is TBD.
3. Editorialist(s) editorialist team
   Primary communicator of the pyramid perspective (typical of today's editorialists).

4. Contributor
   Secondary contributor and coordinating with the editorialist team. Directs support team regarding secure library standards and issues.
5. Editorialist support
   Works closely with the Library manager. Helps update the team regarding competing pyramid libraries and positions (strength and weaknesses analysis).

The actual process will be heavily driven by the specific host social media team. Further, the one of the main design objectives of SoCortex should be to design the system with sufficient flexibility to allow innovation and competition among pyramids so that "natural selection" can occur. Pyramids should have the flexibility to try different allotted options as they operate. After an operational period, a conference can be held to share strategic successes and failures. This will allow system improvement via periodic revisions (akin to evolution).

First a SoCortex a solicitation(s) would be announced. Editorialists, podcasters and, issue leaders, may propose issues and corresponding perspectives that they feel are important. These responses could be collected in a social media catalog/database and social media users could sign up to join an issue perspective set (this may become a Pyramid). Convention(s) should be held (virtual). Issues and perspective sets could be merged or separated. Leadership may be selected via a typical election process. Further polling and voting could be used to define the pyramid leadership team. Candidates can offer their social media activity as part of their bio. Leadership members could be viewed as a management team, subject to a periodic review and competitive election process.

Further, the pyramid infrastructure engineering is responsible for the functionality of the pyramid. Works closely with SoCortex staff and the host media team. Coordinates with engineering teams across pyramids. May mostly be a standalone entity not fully instantiated across pyramids. It is critical to maintain transparency and evenhandedness. Perhaps this should be open minded (apolitical) team that views each pyramid as a product line of equal value. In this case the pyramid engineering team should be viewed as program managers and application engineers.

Further, the library support of the pyramid creates, integrates, and maintains the library. All access and security are controlled by the team. The library should behave somewhat like a document control system. All changes should be traceable and coordinated. Most team efforts will be driven by library change requests (LCR) and library change orders (LCO). Virtual meetings will be held with appropriate membership. Recognition of LCR, LCO quality and importance should be part of the credibility weighting of users and advocates.

Further, the pyramid Security works closely with host media engineering, and third party auditors, making sure functional audit tools are available and properly utilized. This is a functional requirement; nature of staff is to be determined.

Further, the pyramid performance assessment is based on metrics created by staff and also staff monitors pyramid effectiveness. These details will rapidly adapt and evolve. Pyramid operation will heavily drive the specifics of this service. Broad categories of metrics will likely involve advocate performance, library growth and quality and social media pyramid penetration. Intra polling results will also be an important component. Not necessarily handled by a specific group of individuals. Will be influenced and limited by host social media tools.

Further, the strategy advocates monitor competing pyramids strategies and recommend strategy enhancements (pyramid recruitment, training methods etc.) This is a functional requirement; nature of staff is TBD. Likely that the advocate base will be highly active here (this would be a good indication of pyramid engagement)

Further, the pyramid IT/Social Media gateway works with host media in streamlining and maintaining the SoCortex social media interface Further, the inter-pyramid management is responsible for inter-pyramid activities. Coordinates with pyramids that share the same issue. Coordinates with social media host in the SoCortex bug fixes and upgrades.

Further, the poll engineering associated with the pyramid facilitates creating polls, evaluating pyramid effectiveness. Comparing poll results with competing pyramids. Further, the staff shall be appointed by leadership. Further, the hyperlink tool facilitates search by source, author, text terms, search related cloud, pyramid guided cloud search, library table of contents (links) view, relationship tree (links) view, hover and expand and trace, contention/rejection history, future schedule, access history, certification (origin, maintenance, update verification) and access charges.

Further, on the secure side of the SoCortex® firewalled participants select/elect trusted reviewers (for this issue/topic only). This process is key to all that follows. Trusted contributors build the Secure Library using qualified news sources. Leadership, in conjunction with pyramid resources does the qualification.

Further, the pyramid leadership activities mainly involve, advocate training and recruitment, improving the secure library and, updating editorials. Since the library is universally accessible it is one of the most important pyramid "products". During the pyramid's "operational phase" members/advocates use the library to engage in iterative self-paced learning and dialog. In addition, facts are added, removed, updated, and corrected (using a controlled (LCR, LCO process) further refining the secure library fact base. By this method a pyramid ultimately develops a fact-based consensus that is finally output as detailed poll (this is also a product). Ultimately Pyramids with conflicting perspectives conference and debate in virtual conferences (inter-pyramid review and resolution). This "conference phase" outputs an inter-pyramid consensus poll that represents the best efforts of all members to achieve consensus.

In the secured area participants can converse, set up debates and Events using the Library or any news/thoughts they choose. Leadership can establish training courses based upon library materials. Member interactions with the course work and exams can be part of the advocate/member rating system.

Significant time and effort will be required by the hosting social media, pyramid leadership, staff, advocates, and legacy media sources. Secure hyperlink supported media sources will also be required. Compensation via free market interchange (micro-subscriptions) will support and drive the activity of the SoCortex and its social allies. Legacy Media will be financially incentivized by micro-subscriptions when they become referenced in SoCortex libraries. If they do not compete against other media sources, they will become irrelevant. This will improve journalistic quality across the industry. This could be termed "pyramid media pull."

Advocates deserve and need rational informed dialog. But since all membership/advocates are involved in an issue/perspective learning process, dialog should be tailored to their immediate need and readiness. Since dialog demands tailoring and bandwidth it should be personalized and distributed.

Further, since, on average, new membership will start with limited perspective knowledge and a limited commitment to the perspective and since earlier committed, trained membership is limited in number (and better informed), the pyramid, "layered user structure" makes sense.

Pyramid advocate buildout will be heavily influenced by social media tools, adaption, and evolution. Three types of models are anticipated; Node weighting (NW); Multi-level marketing (MLM); and various hybrids of MLM and NW. Unlimited hybrid models could become available as the SoCortex "evolves" in its application, so this is defined on a trial-and-error basis (the mutation engine of "evolution").

Advocates act as recruiters and trainers. Recruits dialog with their trainers and interact with self-paced training materials in the secure library. As they master the materials and mature in their dialogs their node weighting is promoted. Quality of dialog, editorials, library support and recruiting and all successful efforts should be rewarded with increased node weighting and recognition. The MLM model provides a defined methodology for establishing node weightings and the pyramid communication structure. Successful recruiting from opposing perspective pyramids should be encouraged and additionally rewarded. The benefit of the MLM model is that groups less likely to form, rapid recruiting of strong advocates, support of educational requirements, automatic filtering of upstream traffic, supports merited promotion, and can use a buoyancy model promotion scheme (cumulative advocate generation results in promotion (increase in buoyancy. Library interaction can be an objective criterion.

The neuron synaptic node weighting method (NW) facilitates advocate/member buildout, however assignment of weights can become personal and political. Additionally, assignment of weights can be time consuming and burdensome, and motivation of advocates may become lacking.

Figure 15:
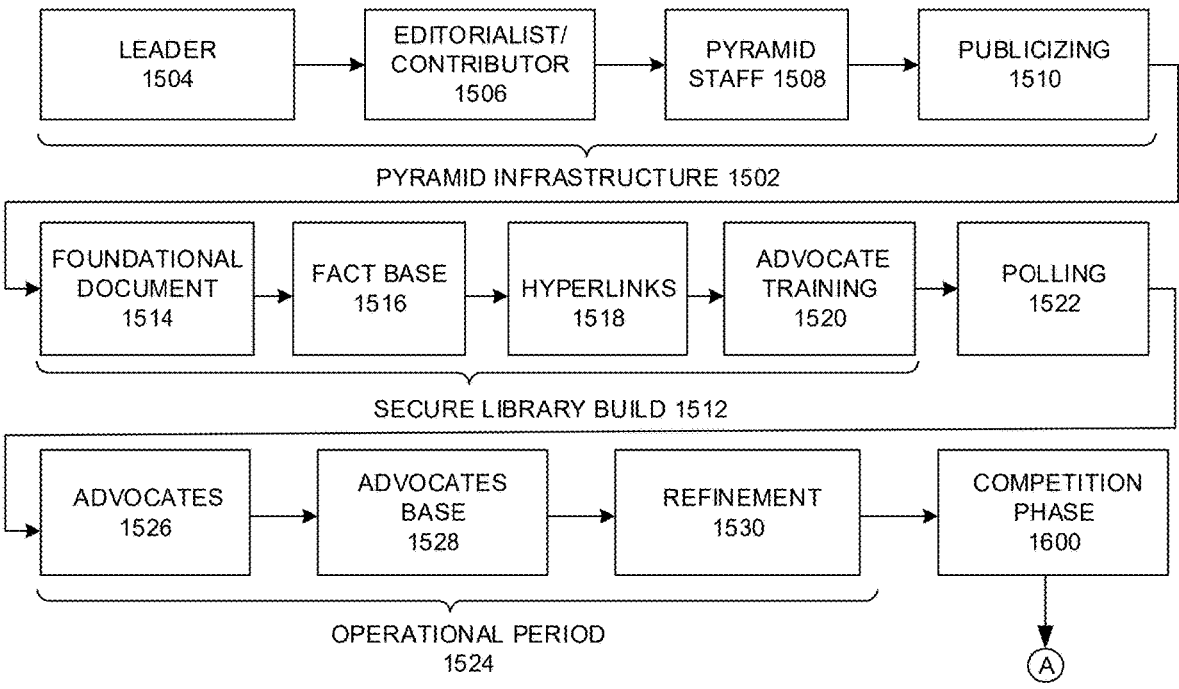
FIG. 15 illustrates a pyramid creation and operation, in accordance with some embodiments.

Further, in reference to FIG. 15, a SoCortex a solicitation (s) would be announced. Editorialists, podcasters and, issue leaders, may propose issues and corresponding perspectives that they feel are important. These responses could be collected in a social media catalog/database and social media users could sign up to join an issue perspective set (this may become a Pyramid). Convention(s) should be held (virtual). Issues and perspective sets could be merged or separated. Leadership may be selected via a typical election process. Further polling and voting could be used to define the pyramid leadership team. Candidates can offer their social media activity as part of their bio. Leadership members could be viewed as a management team, subject to a periodic review and competitive election process Typical Pyramid operations and requirements:

Pyramids and their leadership can represent competing or cooperating policies or policy fragments (or perspectives).

Pyramid interfaces to the Social media platforms as well as to each other must be compatible.

Advocates can submit Library Change Requests (LCR). These will propagate through the membership and up to the Library manger and leadership. If the modification is approved a Library Change Notification (LCN) will result and be transmitted involved memberships (the Library is treated as if it is under documentation control and a Pyramid work product).

Virtual Conferences are held to coordinate interfaces and resources (i.e. secured library contents and structure).

Coordinated pyramids reach resolution at agreed upon timing (synchronization). Conferences may be used for this purpose.

Conferences result in Library updates (repeat as required). The review cycles result in viewpoint summaries and an inter-Pyramid poll.

Pyramids and their leaders can represent competing or cooperating policies or policy fragments (or perspectives).

Pyramid interfaces to the Social media platforms as well as to each other must be compatible.

Virtual Conferences are held to coordinate interfaces and resources (i.e. secured library contents and structure).

Coordinated pyramids reach resolution at agreed upon timing (synchronization). Conferences may be used for this purpose.

Conferences result in Library updates (repeat as required). The review cycles result in viewpoint summaries and an inter-pyramid poll.

Further, the user base of the pyramid bridges into its social media host user base. All users can access the pyramid's secure library for credible, traceable opinion and news. User communications with the pyramid's higher ranked members is restricted in order to maintain efficient high quality, low noise communications.

Further, advancing in the pyramid ranking (towards its apex) requires that the user escalate his commitment by demonstrating expertise in the library materials, participating in supporting informed credible discussions, and advocating/recruiting new pyramid members. Supporting pyramid library and infrastructure could also be credited.

Further, the apex of the pyramid is occupied by its user leadership and its strongest pyramid advocates. Ultimately the pyramid apex (leadership) transmits the perspective of all participants of the pyramid in the form of a detailed operating polls. Finally pyramids, via a competitive process (like an extended organized debate) merge polls and resolve secure libraries. The process culminates in a consensus yielding a poll format and a combined, resolved library.

Further, the pyramid teaches the perspective with challenge by the students (poll). Challenge is used to update the library (library change request, library clarification, enhancement, then library change order) and modify context and assertions. Library is a set of controlled documents.

Poll breakout can be in terms of measuring effectiveness of persuasion vs. pyramid ranking.

Once partial consensus is reached of a perspective the final objective of free speech is achieved by mutual understanding of competing perspectives with head-to-to head compromise and resolution. With the SoCortex technology this process requires intra-pyramid cooperation and competition.

Further, the system may utilize algorithms like greedy algorithms or priority queues to dynamically prioritize data, ensuring that the most critical information is made available first. For example, in a financial trading system, this feature could aggregate market data from various sources and prioritize real-time trade signals over historical data, thereby enhancing decision-making efficiency.

Further, the algorithm may utilize machine learning techniques to predict future network demands and reroute traffic accordingly. For instance, in a distributed computing environment, it could route data through the least congested path while ensuring high-priority data receives precedence.

Further, the system may use natural language processing and semantic analysis to understand the context of data and adjust priorities accordingly.

Further, the algorithm may use probabilistic methods or streaming analytics to compute interim results as data arrives, enabling near-instantaneous decisions based on partial information with high confidence levels.

Further, the system may use supervised learning algorithms to train models based on labeled data, allowing the system to automatically adjust filtering criteria as new information is processed.

Further, the system may use distributed ledger technology to securely store and share information, ensuring data integrity and traceability.

Further, the system may use edge computing platforms to enable local processing of data at various nodes in a network, ensuring that critical information is available for immediate decision-making without relying on centralized resources.

Further, the system may use advanced fusion techniques such as sensor fusion, context-aware processing, or semantic integration to combine data from different sources into a unified representation.

FIG. 1 is an illustration of an online platform 100 consistent with various embodiments of the present disclosure. By way of non-limiting example, the online platform 100 may be hosted on a centralized server 102, such as, for example, a cloud computing service. The centralized server 102 may communicate with other network entities, such as, for example, a mobile device 106 (such as a smartphone, a laptop, a tablet computer etc.), other electronic devices 110 (such as desktop computers, server computers etc.), databases 114, and sensors 116 over a communication network 104, such as, but not limited to, the Internet. Further, users of the online platform 100 may include relevant parties such as, but not limited to, end-users, administrators, service providers, service consumers and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 200.

Figure 2:
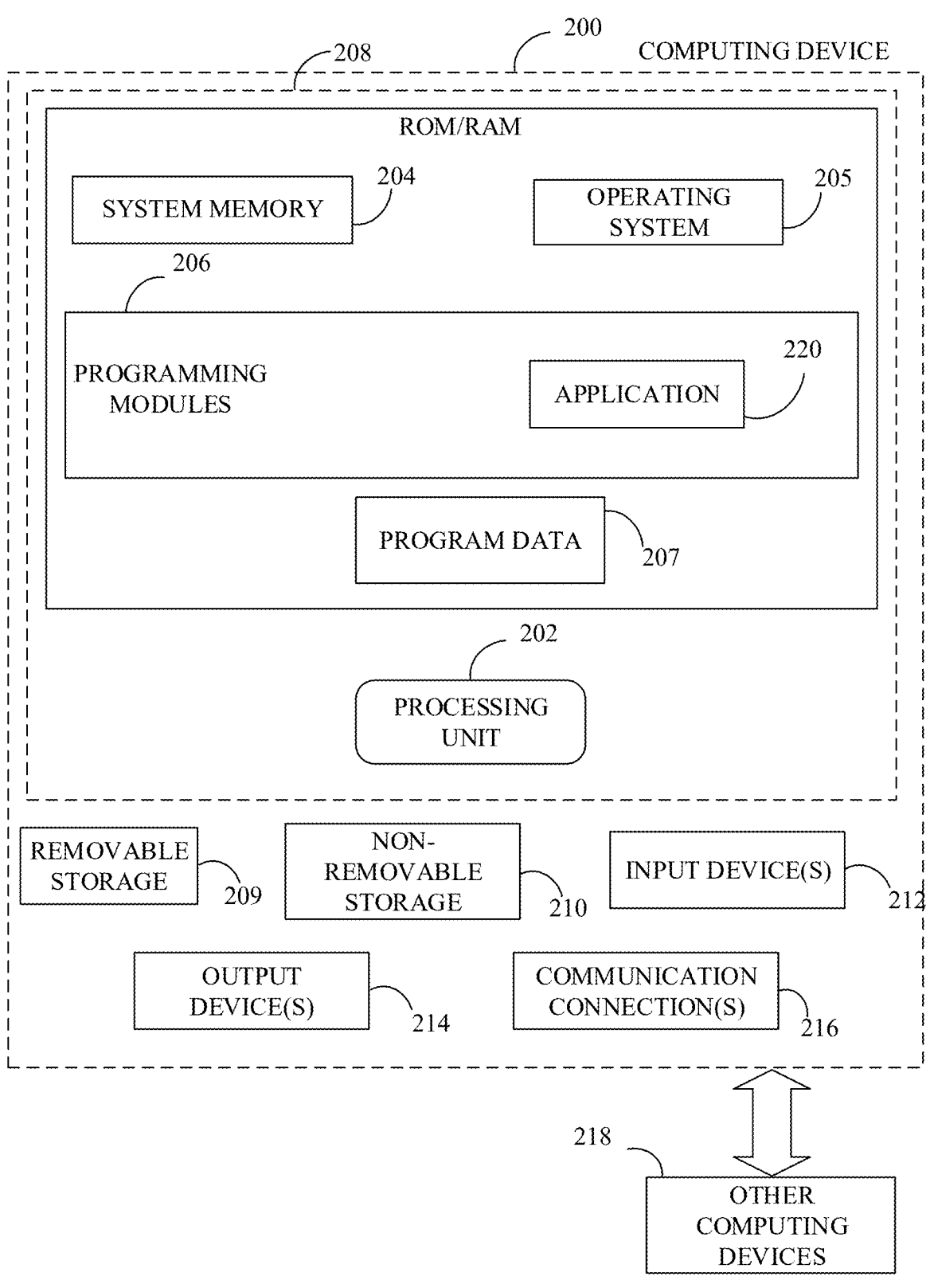
FIG. 2 is a block diagram of a computing device 200 for implementing the methods disclosed herein, in accordance with some embodiments.

With reference to FIG. 2, a system consistent with an embodiment of the disclosure may include a computing device or cloud service, such as computing device 200. In a basic configuration, computing device 200 may include at least one processing unit 202 and a system memory 204. Depending on the configuration and type of computing device, system memory 204 may comprise, but is not limited to, volatile (e.g. random-access memory (RAM)), non-volatile (e.g. read-only memory (ROM)), flash memory, or any combination. System memory 204 may include operating system 205, one or more programming modules 206, and may include a program data 207. Operating system 205, for example, may be suitable for controlling computing device 200's operation. In one embodiment, programming modules 206 may include image-processing module, machine learning module. Furthermore, embodiments of the disclosure may be practiced in conjunction with a graphics library, other operating systems, or any other application program and is not limited to any particular application or system. This basic configuration is illustrated in FIG. 2 by those components within a dashed line 208.

Computing device 200 may have additional features or functionality. For example, computing device 200 may also include additional data storage devices (removable and/or non-removable) such as, for example, magnetic disks, optical disks, or tape. Such additional storage is illustrated in FIG. 2 by a removable storage 209 and a non-removable storage 210. Computer storage media may include volatile and non-volatile, removable and non-removable media implemented in any method or technology for storage of information, such as computer-readable instructions, data structures, program modules, or other data. System memory 204, removable storage 209, and non-removable storage 210 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 200. Any such computer storage media may be part of device 200. Computing device 200 may also have input device(s) 212 such as a keyboard, a mouse, a pen, a sound input device, a touch input device, a location sensor, a camera, a biometric sensor, etc. Output device(s) 214 such as a display, speakers, a printer, etc. may also be included. The aforementioned devices are examples and others may be used.

Computing device 200 may also contain a communication connection 216 that may allow device 200 to communicate with other computing devices 218, such as over a network in a distributed computing environment, for example, an intranet or the Internet. Communication connection 216 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 204, including operating system 205. While executing on processing unit 202, programming modules 206 (e.g., application 220 such as a media player) may perform processes including, for example, one or more stages of methods, algorithms, systems, applications, servers, databases as described above. The aforementioned process is an example, and processing unit 202 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like.

Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Figure 3B:
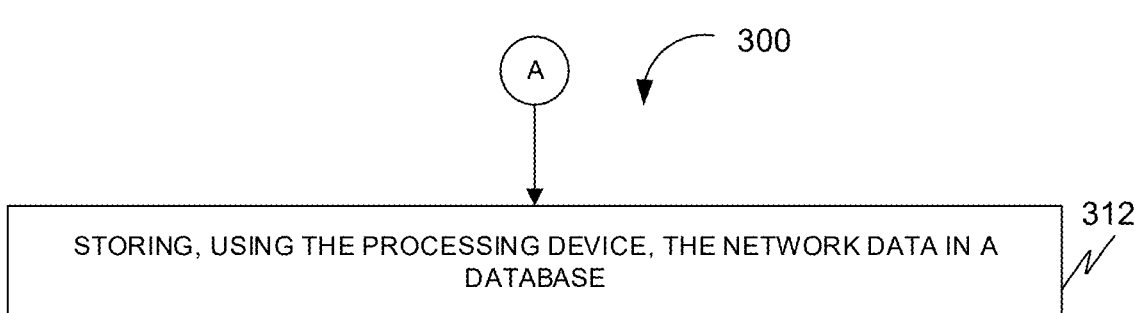
FIG. 3B illustrates a continuation of the flowchart of the method 300 of facilitating an informed consensus-driven discussion, in accordance with some embodiments.

FIG. 3A and FIG. 3B illustrate a flowchart of a method 300 of facilitating an informed consensus-driven discussion, in accordance with some embodiments.

Accordingly, the method 300 may include a step 302 of receiving, using a communication device 902, a discussion data from a user device. Further, the discussion data corresponds to a topic of a discussion. Further, the method 300 may include a step 304 of receiving, using the communication device 902, two or more user role data from the user device. Further, the two or more user role data corresponds to two or more user roles corresponding to two or more users. Further, the two or more users contributes to the discussion. Further, the method 300 may include a step 306 of obtaining, using a processing device 904, a resource data based on the discussion data. Further, the resource data corresponds to a resource associated with the topic. Further, the method 300 may include a step 308 of determining, using the processing device 904, a service data based on the discussion data. Further, the service data corresponds to a service associated with the discussion. Further, the method 300 may include a step 310 of generating, using the processing device 904, a network data based on each of the two or more user data, the resource data, and the service data. Further, the network data corresponds to a hierarchical network aggregating each of the two or more users, the resource and the service, may. Further, the network data represents a hierarchical significance of the two or more users. Further, the method 300 may include a step 312 of storing, using the processing device 904, the network data in a database.

In some embodiments, the hierarchical network includes each of two or more nodes and two or more edges. Further, the two or more nodes represents the two or more users. Further, the two or more edges corresponds to a connection between the two or more nodes. Further, the two or more edges represents the hierarchical significance.

In some embodiments, the hierarchical network corresponds to a layered network comprising two or more layers. Further, each of the two or more layers corresponds to a distinct user role. Further, the two or more layers includes each of a first layer, a second layer, a third layer, a fourth layer, and a fifth layer. Further, the first layer corresponds to a network leader role. Further, the second layer corresponds to an editorialist role. Further, the third layer corresponds to a contributor role. Further, the fourth layer and the fifth layer corresponds to a staff role and an advocate role respectively. Further, the two or more user roles includes each of the network leader role, the editorialist role, the contributor role, the staff role, and the advocate role.

FIG. 4 illustrates a flowchart of a method 400 of facilitating an informed consensus-driven discussion including generating, using the processing device 904, a training data, in accordance with some embodiments.

Further, in some embodiments, the method 400 further may include a step 402 of generating, using the processing device 904, a training data based on the resource data. Further, the training data corresponds to a subject matter associated with the topic. Further, the training data may be configured to educate the two or more users for the discussion. Further, in some embodiments, the method 400 further may include a step 404 of storing, using the processing device 904, the training data in the database.

FIG. 5 illustrates a flowchart of a method 500 of facilitating an informed consensus-driven discussion including generating, using the processing device 904, a result data, in accordance with some embodiments.

Further, in some embodiments, the method 500 further may include a step 502 of receiving, using the communication device 902, two or more user discussion data from two or more user devices associated with a two or more advocates. Further, the two or more user discussion data corresponds to two or more advocate inputs for the discussion. Further, in some embodiments, the method 500 further may include a step 504 of analyzing, using the processing device 904, the two or more user discussion data based on the network data. Further, in some embodiments, the method 500 further may include a step 506 of generating, using the processing device 904, a result data based on the analyzing of the two or more user discussion data. Further, the result data corresponds to an outcome of the service. Further, in some embodiments, the method 500 further may include a step 508 of transmitting, using the communication device 902, the result data to the user device.

In some embodiments, the two or more user discussion data includes a noise data. Further, the noise data comprises one or more of a false data and an extraneous data in relation to the topic of discussion. Further, the receiving of the two or more user discussion data based on the hierarchical network facilitates a filtering of the noise data, Further, the hierarchical network is associated with the two or more advocates. Further, the filtering is based on the two or more advocates.

FIG. 6 illustrates a flowchart of a method 600 of facilitating an informed consensus-driven discussion including generating, using the processing device 904, a resource library data, in accordance with some embodiments.

Further, in some embodiments, the method 600 further may include a step 602 of generating, using the processing device 904, a resource library data based on the resource data. Further, the resource library data corresponds to a repository of a two or more facts in relation to a topic of discussion. Further, the resource library data further comprises a unique identifier associated with a source of each of the two or more facts. Further, in some embodiments, the method 600 further may include a step 604 of storing, using the processing device 904, the resource library data in the database.

In some embodiments, the database includes each of two or more network data, two or more of resource library data and two or more user discussion data. Further, the two or more network data corresponds to two or more hierarchical networks. Further, the two or more resource library data corresponds to a two or more repositories corresponding to the two or more hierarchical networks. Further, the two or more hierarchical networks may be associated with two or more discussions. Further, the two or more user discussion data corresponds to the two or more discussions.

FIG. 7 illustrates a flowchart of a method 700 of facilitating an informed consensus-driven discussion including storing, using the processing device 904, the conflict result data, in accordance with some embodiments.

Further, in some embodiments, the method 700 further may include a step 702 of receiving, using the communication device 902, a conflict result data from the user device associated with a user. Further, the user is associated with a leadership role. Further, the conflict result data corresponds to a result of a conflict between the two or more hierarchical networks. Further, the conflict result data is based on one or more of the two or more user discussion data and the two or more resource library data associated with the two or more of hierarchical networks. Further, in some embodiments, the method 700 further may include a step 704 of storing, using the processing device 904, the conflict result data in the database.

FIG. 8 illustrates a flowchart of a method 800 of facilitating an informed consensus-driven discussion including generating, using the processing device 904, a network catalog data, in accordance with some embodiments.

Further, in some embodiments, the method 800 further may include a step 802 of generating, using the processing device 904, a network catalog data based on the network data. Further, the network catalog data corresponds to a catalog of the hierarchical network. Further, in some embodiments, the method 800 further may include a step 804 of storing, using the processing device 904, the network catalog data in the database.

Figure 9:
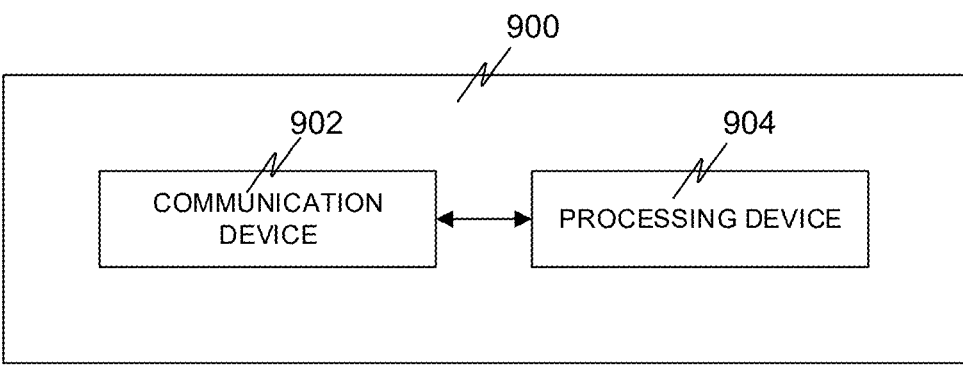
FIG. 9 illustrates a block diagram of a system 900 of facilitating an informed consensus-driven discussion, in accordance with some embodiments.

FIG. 9 illustrates a block diagram of a system 900 of facilitating an informed consensus-driven discussion, in accordance with some embodiments.

Accordingly, the system 900 may include a communication device 902. Further, the communication device 902 may be configured for receiving a discussion data from a user device. Further, the discussion data corresponds to a topic of a discussion. Further, the communication device 902 may be configured for receiving two or more user role data from the user device. Further, the two or more user role data corresponds to two or more user roles corresponding to two or more users. Further, the two or more users contributes to the discussion. Further, the system 900 may include a processing device 904. Further, the processing device 904 may be configured for obtaining a resource data based on the discussion data. Further, the resource data corresponds to a resource associated with the topic. Further, the processing device 904 may be configured for determining a service data based on the discussion data. Further, the service data corresponds to a service associated with the discussion. Further, the processing device 904 may be configured for generating a network data based on each of the two or more user data, the resource data, and the service data. Further, the network data corresponds to a hierarchical network aggregating each of the two or more users, the resource and the service, may. Further, the network data represents a hierarchical significance of the two or more users. Further, the processing device 904 may be configured for storing the network data in a database.

In some embodiments, the hierarchical network includes each of two or more nodes and two or more edges. Further, the two or more nodes represents the two or more users. Further, the two or more edges corresponds to a connection between the two or more nodes. Further, the two or more edges represents the hierarchical significance.

In some embodiments, the hierarchical network corresponds to a layered network comprising two or more layers. Further, each of the two or more layers corresponds to a distinct user role. Further, the two or more layers includes each of a first layer, a second layer, a third layer, a fourth layer, and a fifth layer. Further, the first layer corresponds to a network leader role. Further, the second layer corresponds to an editorialist role. Further, the third layer corresponds to a contributor role. Further, the fourth layer and the fifth layer corresponds to a staff role and an advocate role. Further, the two or more user roles includes each of the network leader role, the editorialist role, the contributor role, the staff role, and the advocate role.

In some embodiments, the processing device 904 may be further configured for generating a training data based on the resource data. Further, the training data corresponds to a subject matter associated with the topic. Further, the training data may be configured to educate the two or more users for the discussion. Further, the processing device 904 may be further configured for storing the training data in the database.

Further, in some embodiments, the communication device 902 may be further configured for receiving two or more user discussion data from two or more user devices associated with a two or more advocates. Further, the two or more user discussion data corresponds to two or more advocate inputs for the discussion. Further, the processing device 904 may be further configured for analyzing the two or more user discussion data based on the network data. Further, the processing device 904 may be further configured for generating a result data based on the analyzing of the two or more user discussion data. Further, the result data corresponds to an outcome of the service, may. Further, the communication device 902 may be further configured for transmitting the result data to the user device.

In some embodiments, the two or more user discussion data includes a noise data. Further, the noise data comprises one or more of a false data and an extraneous data in relation to the topic of discussion. Further, the receiving of the two or more user discussion data based on the hierarchical network facilitates a filtering of the noise data, Further, the hierarchical network is associated with the two or more advocates. Further, the filtering is based on the two or more advocates.

In some embodiments, the false data comprises an error data comprising an error detail. Further, the extraneous data corresponds to an irrelevant detail.

Further, in some embodiments, the processing device 904 may be further configured for generating a resource library data based on the resource data. Further, the resource library data corresponds to a repository of fact in relation to the topic of discussion. Further, the resource library data further comprises a unique identifier associated with a source of each of the plurality of facts. Further, the processing device 904 may be further configured for storing the resource library data in the database.

In some embodiments, the database includes each of two or more network data, two or more resource library data and two or more user discussion data. Further, the two or more network data corresponds to two or more hierarchical networks. Further, the two or more of resource library data corresponds to two or more repositories corresponding to the two or more or hierarchical networks. Further, the two or more hierarchical networks may be associated with two or more discussions. Further, the two or more user discussion data corresponds to the two or more discussions.

Further, in some embodiments, the communication device 902 may be further configured for receiving a conflict result data from the user device associated with a user. Further, the user is associated with a leadership role. Further, the conflict result data corresponds to a result of a conflict between the two or more hierarchical networks. Further, the conflict result data is based on one or more of the two or more user discussion data and the two or more of resource library data associated with the two or more of hierarchical networks. Further, the processing device 904 may be configured for storing the conflict result data in the database.

Further, in some embodiments, the processing device 904 may be further configured for generating a network catalog data based on the network data. Further, the network catalog data corresponds to a catalog of the hierarchical network. Further, the processing device 904 may be further configured for storing the network catalog data in the database.

In some embodiments, the processing device 904 may be further configured for storing the plurality of user discussion data in the database.

In some embodiments, the database includes a social media database.

In some embodiments, the communication device 902 is further configured for transmitting the network catalog data to two or more user devices associated with the two or more users.

In some embodiments, the two or more users includes a two or more social media users.

In some embodiments, the receiving of the two or more of discussion data is based on the network catalog data.

In some embodiments, the hierarchical network corresponds to a multipoint packetized communication network. Further, the hierarchical network includes two or more nodes representing the two or more users. Further, the hierarchical network facilitates a communication between the two or more nodes based on a packetized data.

In some embodiments, the hierarchical network is configured to facilitated informed human free speech and dialog.

In some embodiments, each of the two or more edges may be characterized by a weight. Further, the weight corresponds to a numerical value representing an intensity of the hierarchical significance.

In some embodiments, the user device may be associated with one or more of two or more users. Further, the one or more of the two or more users may be associated with a network leader role.

In some embodiments, the method 300 may further include receiving, using the communication device 902, a rule data from the user device. Further, the rule data corresponds to a rule for each of the two or more user roles. Further, the generating of the network data may be further based on the analyzing of the rule data.

In some embodiments, the rule represents a responsibility of each of the two or more users in the discussion.

In some embodiments, the rule represents a level of significance in the discussion.

In some embodiments, the obtaining of the resource data includes retrieving a resource data from an external database. Further, the resource data includes a fact associated with the topic.

In some embodiments, the database is associated with a library change request process and a library changes order process.

In some embodiments, the method 600 may further include receiving, using the communication device 902, a user resource data from the user device. Further, the user resource data corresponds to a contextual detail associated with the topic. Further, the generating of the resource library data may be further based on the user resource data.

In some embodiments, the unique identifier corresponds to a hyperlinked text. Further, the hyperlinked text may be configured to trace back to the source of the two or more facts.

In some embodiments, the resource data corresponds to a verified fact.

In some embodiments, the method 300 may further include receiving, using the communication device 902, a secondary role data from a secondary user device associated with a secondary user. Further, the secondary role data corresponds a secondary user role. Further, the generating of the network data may be further based on the secondary role data.

In some embodiments, the secondary user corresponds to a social media user of a social media platform. Further, the network data may be associated with the social media platform.

In some embodiments, the generating of the network data comprises adding the secondary user in the hierarchical network.

In some embodiments, the secondary user includes a member associated with hierarchical network.

In some embodiments, the two or more advocates is associated with a layered structure of the hierarchical network.

In some embodiments, the method 300 may further include receiving, using the communication device 902, a service indication data from the user device. Further, the service indication data corresponds to indication of the service associated with the discussion. Further, the service data corresponds two or more services. Further, the discussion may be associated with the two or more services. Further, the generating of the result data may be further based on the service indication data.

In some embodiments, the discussion library data represents each of the two or more user inputs with a hyperlinked text. Further, the hyperlinked text may be configured to trace back a source of each of the two or more discussions.

In some embodiments, the two or more user inputs includes one or more of a premise, an assertion, a fact, an opinion and a reference.

In some embodiments, the two or more nodes comprising each of a top node and a bottom node. Further, the two or more users includes each of a first user and a second user. Further, the first user associated with the top node represents a high significance to in relation to the second user. Further, the second user associated with a bottom represents a low significance to in relation to the first user.

FIG. 10 illustrates a flowchart of a method 1000 of facilitating an informed consensus-driven discussion including retrieving, using the processing device 904, at least one of the two or more of user discussion data and the two or more of the resource library data, in accordance with some embodiments.

Further, in some embodiments, the method 1000 further may include a step 1002 of retrieving, using the processing device 904, one or more of the two or more of user discussion data and the two or more of resource library data. Further, in some embodiments, the method 1000 further may include a step 1004 of transmitting, using the communication device 904, the one or more of the two or more of user discussion data and the two or more of resource library data to the user device. Further, the conflict response data is based on the one or more of the two or more of user discussion data and the two or more of resource library data to the user device.

Figure 11:
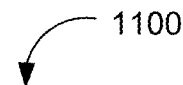
FIG. 11 illustrates a flowchart of a method 1100 of facilitating an informed consensus-driven discussion including generating, using the processing device 904, a modified resource data, in accordance with some embodiments.

FIG. 11 illustrates a flowchart of a method 1100 of facilitating an informed consensus-driven discussion including generating, using the processing device 904, a modified resource data, in accordance with some embodiments.

Further, in some embodiments, the method 1100 further may include a step 1102 of generating, using the processing device 904, a modified resource data based on the two or more advocate inputs. Further, the modified resource data corresponds to a refined digital library comprising a refined-structured detail. Further, in some embodiments, the method 1100 further may include a step 1104 of storing, using the processing device 904, the modified library data in the database.

In some embodiments, the generating of the modified library data includes refining the resource.

In some embodiments, the consensus-driven communication happens in the social media platform.

In some embodiments, the hierarchical network corresponds to a hierarchical pyramid.

In some embodiments, the method 300 may further include storing, using the processing device 904, the two or more user role data in the database.

In some embodiments, the method 300 may further include receiving, using the communication device 902, a user service data from the user device. Further, the user service data corresponds to two or more services associated with the discussion. Further, the generating of the network data may be further based on the user service data.

In some embodiments, the result data corresponds to a poll metric. Further, the service corresponds to a polling.

In some embodiments, one or more of the two or more users associated with the editorialist role facilitates championing the discussion associated with the hierarchical network.

In some embodiments, the two or more services corresponds to one or more of a financial management, an event management, a polling, an intra pyramid service and an inter pyramid service.

In some embodiments, the generating of the network data includes may be based on a ranking the two or more users based on the plurality user roles in relation to the discussion.

In some embodiments, the hierarchical network based on the two or more users facilitates one or more of an organized decision-making, and a recruitment.

In some embodiments, the network catalog data corresponds to description of at least one of an objective of the discussion and a perspective of the hierarchical network. Further, the network catalog data corresponds to a resource description.

Figure 12:
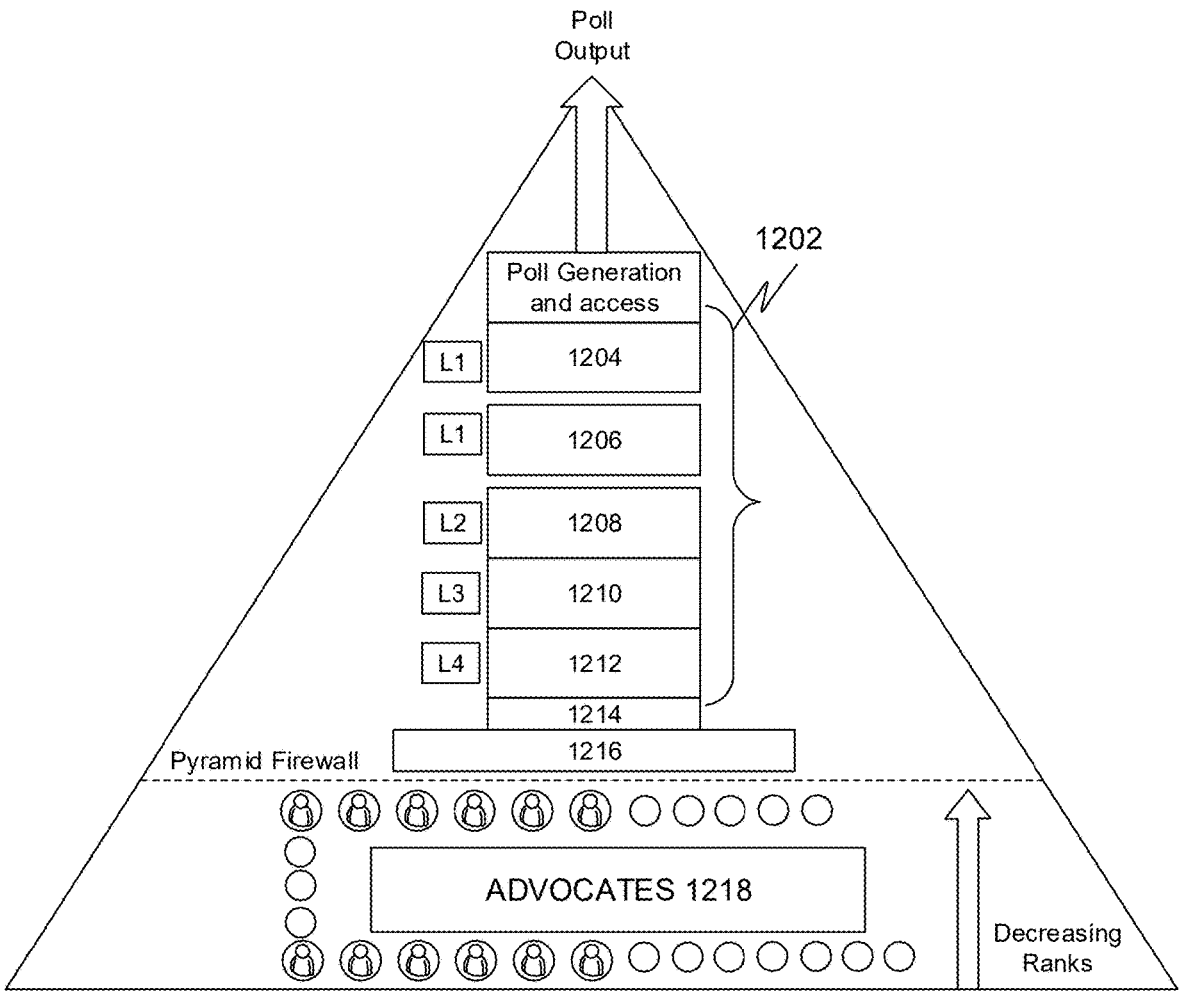
FIG. 12 illustrates a pyramid leadership and advocate hierarchy block diagram, in accordance with some embodiments.

FIG. 12 illustrates a pyramid leadership and advocate hierarchy block diagram, in accordance with some embodiments.

Further, the pyramid leadership block diagram includes a pyramid leadership section 1202. Further, the pyramid leadership section 1202 may two or more levels. Further, the two or more levels include one or more of a pyramid leader 1204, a policy owner 1206, a contributor 1208, an editorialist 1210, and an editorialist support 1212. Further, the pyramid leadership section 1202 may include a pyramid staff 1214. Further, the pyramid includes a secure library 1216. Further, the pyramid may associate with a social media pyramid advocates 1218. Further, the pyramid leadership block diagram represents an information filtering. Further, the editorialist 1210 may champion a perspective of the pyramid. Further, the editorialist 1210 may build a hyperlinked, secure library documenting underlying claims that support the editorials and the perspective. Pyramid polling tools then utilize data sources from social media as well as the pyramid.

Further, the pyramid leadership block diagram is used to represent the pyramid's conceptual structure. The base of the pyramid leadership block diagram represents the interface that many users can use to interact with the pyramids structural resources while the apex of the pyramid leadership block diagram represents the integrated result output of the pyramid (poll output).

Figure 13:
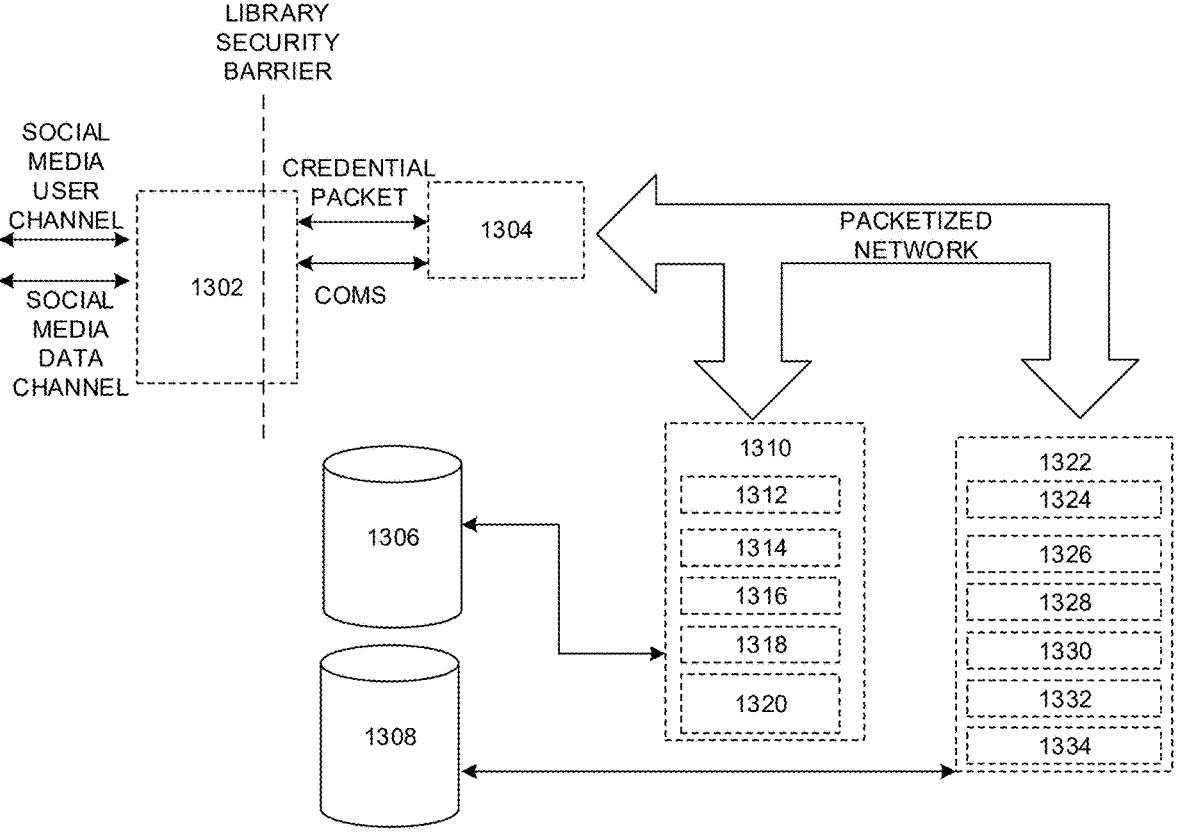
FIG. 13 illustrates a block diagram of a system usage and storage and functional structure, in accordance with some embodiments.

FIG. 13 illustrates a block diagram of a system usage, in accordance with some embodiments.

Further, the system is integrated with a social media host (plugin or equivalent) through a pyramid gateway 1302. Further, the pyramid gateway 1302 act as the pyramid system interface. Further, the pyramid gateway 1302 will interface two or more pyramids in the system with the social media host. Further, the pyramid gateway 1302 provides an additional firewall that secures the pyramid and creates credential headers for all user interactions and data. Further, a pyramid 1304 uses two or more databases. Further, the two or more databases include a pyramid participant database 1306 and a pyramid services database 1308 to qualify and route information to and from pyramid participants 1310 and pyramid services 1322. Further, the pyramid network manager 1304 creates and maintains the pyramids layered network's user and services structure. Further, the pyramid network manager 1304 packets are routed to/from the pyramid participants 1310 and the pyramid services 1322. Further, the pyramid participants 1310 and the pyramid services 1322 are served by their appropriate databases, the pyramid participant database 1306 and the pyramid services database 1308 respectively. Further, the pyramid services 1322 may include a network status service 1324 to monitors pyramid communications for transparency and security. Further, the users can view their connection network history and faults can be flagged for the network manager 1304. Further, the pyramid services 1322 may include a financial management service 1332 to tracks financial transaction information for the network. Further, the pyramid services 1322 may include an event management service 1334 to tracks pyramid schedules and triggers reminders. Further, the pyramid services 1322 may include one or more of an inter pyramid services 1324, a polling service 1326, and a library service 1326.

Figure 14:
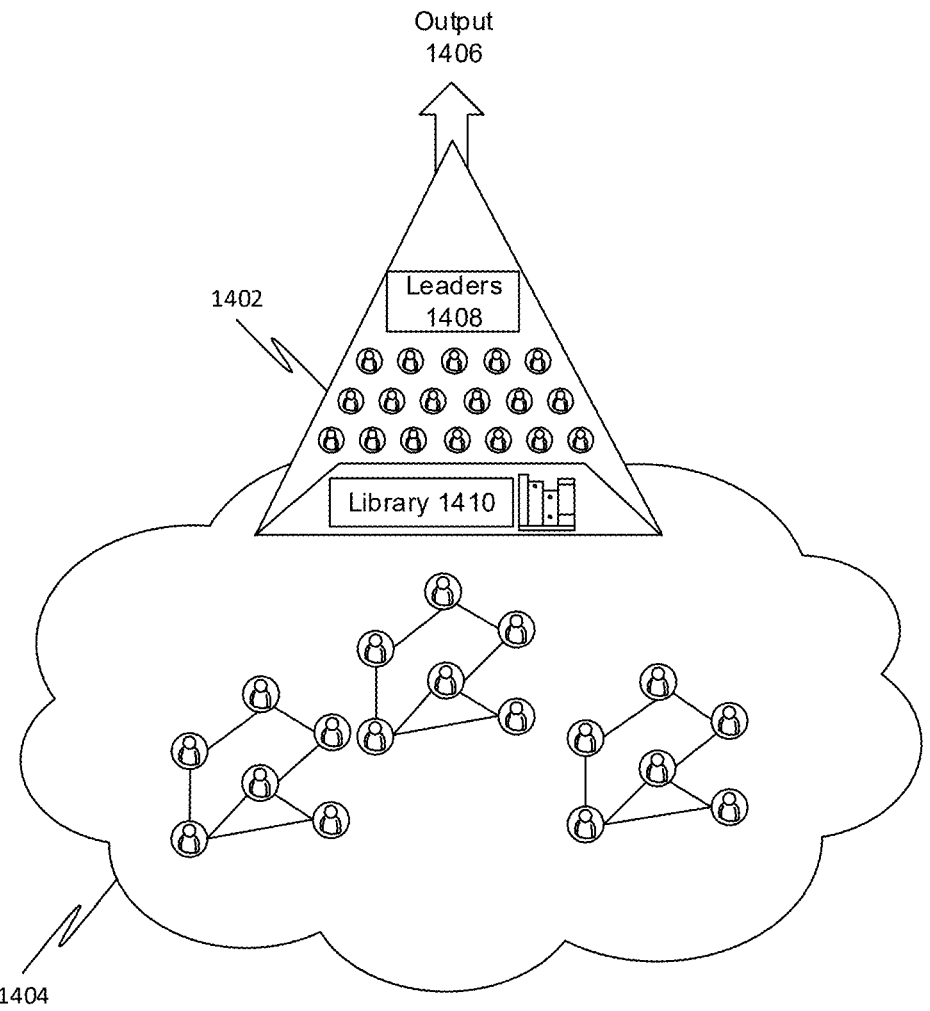
FIG. 14 illustrates an interfacing of a pyramid 1402 with a host 1404, in accordance with some embodiments.

FIG. 14 illustrates an interfacing of the pyramid 1402 with a host 1404, in accordance with some embodiments.

Further, the pyramid 1402 may interface with the host 1404. Further, the host 1404 may include a social media host. Further, the pyramid 1402 facilitates a free market driven, informed and structured human free speech. Further, the pyramid 1402 may provide a qualified poll perspective output 1406. Further, the pyramid 1402 may aggregate two or more leaders 1408 and a library 1410 with a host-based user.

FIG. 15 illustrates a pyramid creation and operation, in accordance with some embodiments.

Further, the pyramid creation includes a pyramid infrastructure creation 1502. Further, the pyramid infrastructure creation 1502 includes one or more of electing or recruit a pyramid leader 1504, followed by recruiting editorialists and contributors 1506. Further, the leadership would establish pyramid staff 1508 and then publicize the relevant issue and perspective of the pyramid 1510. Further, the pyramid creation includes a secure library building 1512. Further, the secure library building 1512 includes creating or collecting foundational documents 1514, gathering a fact base (library) 1516, building out hyperlinks 1518, establishing "advocate training" 1520, and a polling operational 1522. Further, with polling operational the pyramid is created and ready to begin operation period 1524. Further, the operation period 1524 include recruiting initial advocates 1526 which in turn would lead to advocate base operating build out 1528 before finally the refinement of the pyramid library and operation 1530. Further, the operation period 1524 may be followed by entering agreed upon inter-pyramid competition phase 1600.

Figure 16:
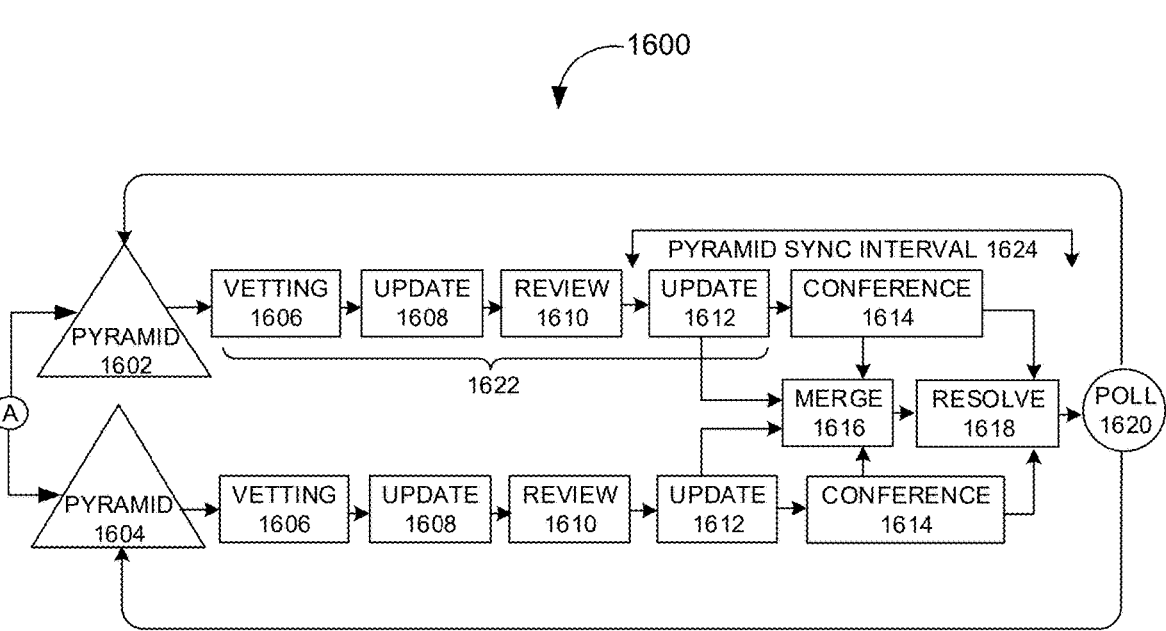
FIG. 16 illustrates an inter-pyramid competition phase 1600, in accordance with some embodiments.

FIG. 16 illustrates an inter-pyramid competition phase 1600, in accordance with some embodiments.

Further, the inter-pyramid competition phase 1600 facilitates an inter-pyramid review and resolution. Further inter-pyramid competition phase 1600 may include a first pyramid 1602 and a second pyramid 1604. Further, the first pyramid 1602 and the second pyramid 1604 may undergo an operational phase 1622. Further, the operational phase 1622 may include a vetting 1606, editorial updating 1608, reviewing 1610, library updating 1612, and virtual conferencing 1614. Further, the inter-pyramid competition phase 1600 may include a library merging 1616. Further, the library merging 1616 may be based on one or more of the libraries updating 1612, and conferencing 1614 of each of the first pyramid 1602 and the second pyramid 1604. Further, the inter-pyramid competition phase 1600 may include a library resolving 1618. Further, the library resolving 1618 may be based on one or more of the conferencing 1614 of each of the first pyramid 1602 and the second pyramid 1604 and the library merging 1616. Further, inter-pyramid competition phase 1600 may include an inter-pyramid polling 1620 based on the library resolving 1618. Further, the inter-pyramid review may include a two or more iterations based on an agreement. Further, one or more of the library updating 1612, the conferencing 1614, the library resolving 1618, and the library merging 1616 may occurs over a pyramid sync interval 1624.

Figure 17:
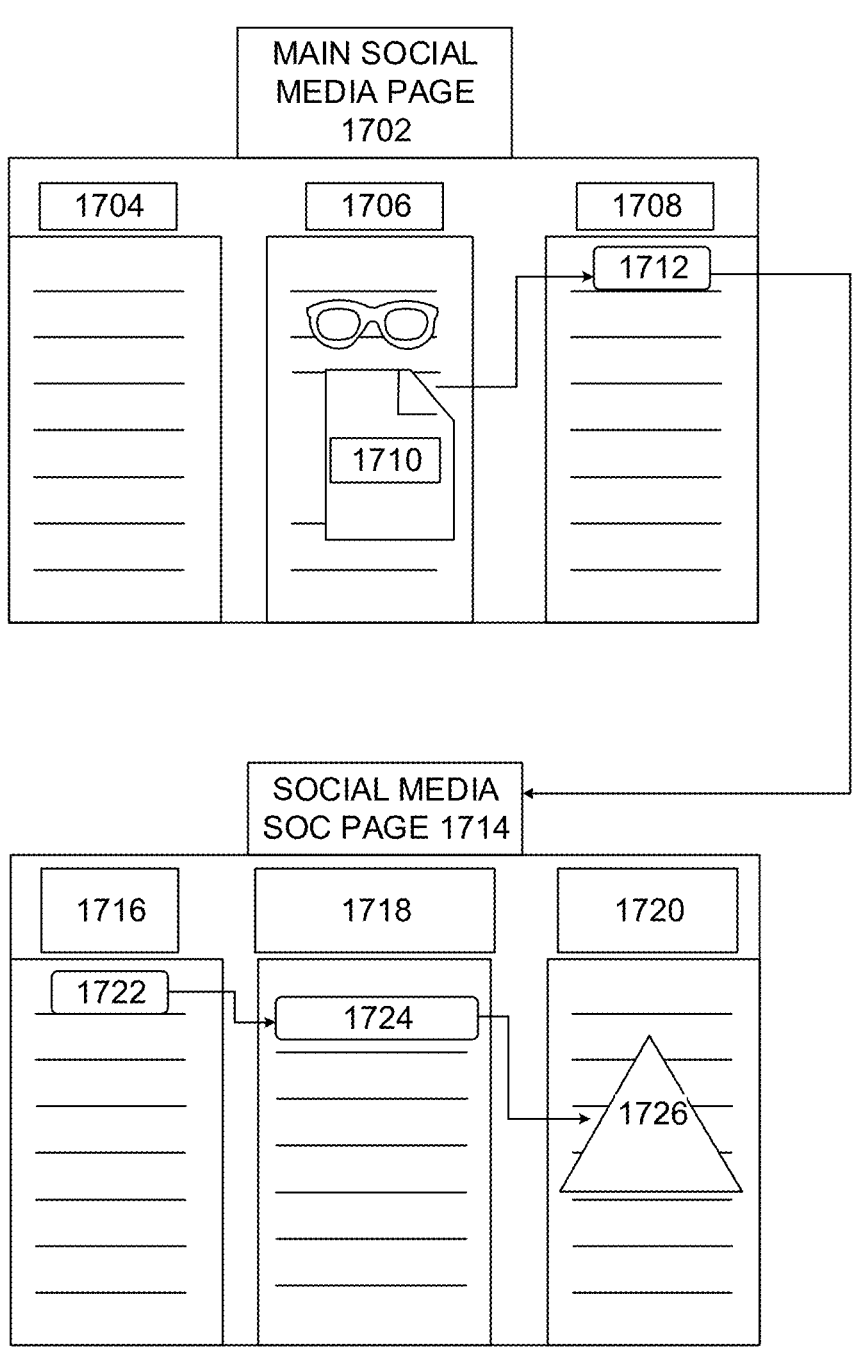
FIG. 17 illustrates a flow of pyramid addressing process, in accordance with some embodiments.

FIG. 17 illustrates a flow of pyramid addressing process, in accordance with some embodiments.

Further, the user device may include a user presentation device configured to present one or more of a main page 1702 and an operation page 1714. Further, the main page 1702 may include one or more of a main section 1704, a post section 1706 and an auxiliary section 1708. Further, the post section includes a post content 1710. Further, the auxiliary section includes an operation icon 1712. Further, the user may notice the post content which leads the user to interact with the operation icon 1712. Further, the operation icon 1712 may correspond to the post content 1710. Further, a user interaction with the operation icon 1712 may redirect the user from the main page 1702 to the operation page 1714. Further, the operation page 1724 may include one or more of a library main section 1716, a perspective section 1718 and a pyramid section 1720. Further, the post content 1710 corresponds to an issue content. Further, the user may interact with an issue 1722 enlisted in the catalog main section. Further, the perspective section 1718 and the pyramid section 1720 may include an issue related perspective 1724 and an issue related pyramid 1726 respectively. Further the operation page may include a security operation page.

FIG. 18 illustrates a flow of user discussion data in an advocate layer, in accordance with some embodiments.

Further, the flow of user discussion data between two or more advocates follows a criterion for upward communication. Further, the criterion may correspond to a one level upbound based on a weighting in the hierarchical network. Further, the criterion facilitates an advocate training based on the library content. Further, the criterion facilitates an accessing of the library content. Further, the hierarchical significance indicates a low significance for a new advocate.

Although the invention has been explained in relation to its preferred embodiment, it is to be understood that many other possible modifications and variations can be made without departing from the spirit and scope of the invention as hereinafter claimed.

The invention claimed is:

1. A method of facilitating an informed consensus-driven discussion, wherein the method comprising:

receiving, using a communication device, a discussion data from a user device, wherein the discussion data corresponds to a topic of a discussion;

receiving, using the communication device, a plurality of user role data from the user device, wherein the plurality of user role data corresponds to a plurality of user roles corresponding to a plurality of users, wherein the plurality of users contributes to the discussion;

obtaining, using a processing device, a resource data based on the discussion data, wherein the resource data corresponds to a resource associated with the topic;

determining, using the processing device, a service data based on the discussion data, wherein the service data corresponds to a service associated with the discussion;

generating, using the processing device, a network data based on each of the plurality of user data, the resource data, and the service data, wherein the network data corresponds to a hierarchical network aggregating each of the plurality of users, the resource and the service, wherein the network data represents a hierarchical significance of the plurality of users; and storing, using the processing device, the network data in a database;

wherein the hierarchical network corresponds to a layered network comprising a plurality of layers, wherein each of the plurality of layers corresponds to a distinct user role, wherein the plurality of layers comprises each of a first layer, a second layer, a third layer, a fourth layer, and a fifth layer, wherein the first layer corresponds to a network leader role, wherein the second layer corresponds to an editorialist role, wherein the third layer corresponds to a contributor role, wherein the fourth layer and the fifth layer corresponds to a staff role and an advocate role respectively, wherein the plurality of user roles comprises each of the network leader role, the editorialist role, the contributor role, the staff role, and the advocate role.

2. The method of claim 1, wherein the hierarchical network comprises each of a plurality of nodes and a plurality of edges, wherein the plurality of nodes represents the plurality of users, wherein the plurality of edges corresponds to a connection between the plurality of nodes, wherein the plurality of edges represents the hierarchical significance.

3. The method of claim 1 further comprises:

generating, using the processing device, a training data based on the resource data, wherein the training data corresponds to a subject matter associated with the topic, wherein the training data is configured to educate the plurality of users for the discussion; and storing, using the processing device, the training data in the database.

4. The method of claim 1 further comprises:

receiving, using the communication device, a plurality of user discussion data from a plurality of user devices associated with a plurality of advocates, wherein the plurality of user discussion data corresponds to a plurality of advocate inputs for the discussion;

analyzing, using the processing device, the plurality of user discussion data based on the network data;

generating, using the processing device, a result data based on the analyzing of the plurality of user discussion data, wherein the result data corresponds to an outcome of the service; and transmitting, using the communication device, the result data to the user device.

5. The method of claim 4, wherein the plurality of user discussion data comprises a noise data, wherein the noise data comprises at least one of a false data and an extraneous data in relation to the topic of discussion, wherein the receiving of the plurality of user discussion data based on the hierarchical network facilitates a filtering of the noise data, wherein the hierarchical network is associated with the plurality of advocates, wherein the filtering is based on the plurality of advocates.

6. The method of claim 4 further comprises:

generating, using the processing device, a resource library data based on the resource data, wherein the resource library data corresponds to a repository of a plurality of facts in relation to a topic of discussion, wherein the resource library data further comprises a unique identifier associated with a source of each of the plurality of facts; and storing, using the processing device, the resource library data in the database.

7. The method of claim 6, wherein the database further comprises each of a plurality of network data, a plurality of resource library data and a plurality of user discussion data, wherein the plurality of network data corresponds to a plurality of hierarchical networks, wherein the plurality of resource library data corresponds to a plurality of repositories corresponding to the plurality of hierarchical networks, wherein the plurality of hierarchical networks is associated with a plurality of discussions, wherein the plurality of discussion user discussion data corresponds to the plurality of discussions.

8. The method of claim 7 further comprises:

receiving, using the communication device, a conflict result data from the user device associated with a user, wherein the user is associated with a leadership role, wherein the conflict result data corresponds to a result of a conflict between the plurality of hierarchical networks, wherein the conflict result data is based on at least one of the plurality of user discussion data and the plurality of resource library data associated with the plurality of hierarchical networks; and storing, using the processing device, the conflict result data in the database.

9. The method of claim 1 further comprises:

generating, using the processing device, a network catalog data based on the network data, wherein the network catalog data corresponds to a catalog of the hierarchical network;

storing, using the processing device, the network catalog data in the database.

10. A system of facilitating an informed, consensus-driven discussion, wherein the system comprising:

a communication device configured for:

receiving a discussion data from a user device, wherein the discussion data corresponds to a topic of a discussion;

receiving a plurality of user role data from the user device, wherein the plurality of user role data corresponds to a plurality of user roles corresponding to a plurality of users, wherein the plurality of users contributes to the discussion;

a processing device configured for:

obtaining a resource data based on the discussion data, wherein the resource data corresponds to a resource associated with the topic;

determining a service data based on the discussion data, wherein the service data corresponds to a service associated with the discussion;

generating a network data based on each of the plurality of user data, the resource data, and the service data, wherein the network data corresponds to a hierarchical network aggregating each of the plurality of users, the resource and the service, wherein the network data represents a hierarchical significance of the plurality of users; and storing the network data in a database;

wherein the hierarchical network corresponds to a layered network comprising a plurality of layers, wherein each of the plurality of layers corresponds to a distinct user role, wherein the plurality of layers comprises each of a first layer, a second layer, a third layer, a fourth layer, and a fifth layer, wherein the first layer corresponds to a network leader role, wherein the second layer corresponds to an editorialist role, wherein the third layer corresponds to a contributor role, wherein the fourth layer and the fifth layer corresponds to a staff role and an advocate role, wherein the plurality of user roles comprises each of the network leader role, the editorialist role, the contributor role, the staff role, and the advocate role.

11. The system of claim 10, wherein the hierarchical network comprises each of a plurality of nodes and a plurality of edges, wherein the plurality of nodes represents the plurality of users, wherein the plurality of edges corresponds to a connection between the plurality of nodes, wherein the plurality of edges represents the hierarchical significance.

12. The system of claim 10, wherein the processing device is further configured for:

generating a training data based on the resource data, wherein the training data corresponds to a subject matter associated with the topic, wherein the training data is configured to educate the plurality of users for the discussion; and Storing the training data in the database.

13. The system of claim 10, wherein the communication device is further configured for:

receiving a plurality of user discussion data from a plurality of user devices associated with a plurality of advocates, wherein the plurality of user discussion data corresponds to a plurality of advocate input for the discussion;

transmitting the result data to the user device, wherein the processing device is further configured for:

analyzing the plurality of user discussion data based on the network data; and generating a result data based on the analyzing of the plurality of user discussion data, wherein the result data corresponds to an outcome of the service.

14. The system of claim 13, wherein the plurality of user discussion data comprises a noise data, wherein the noise data comprises at least one of a false data and an extraneous data in relation to the topic of discussion, wherein the receiving of the plurality of user discussion data based on the hierarchical network facilitates a filtering of the noise data, wherein the hierarchical network is associated with the plurality of advocates, wherein the filtering is based on the plurality of advocates.

15. The system of claim 13, wherein the processing device is further configured for:

generating a resource library data based on the resource data, wherein the resource library data corresponds to a repository of fact in relation to the topic of discussion, wherein the resource library data further comprises a unique identifier associated with a source of each of the plurality of facts; and storing the resource library data in the database.

16. The system of claim 15, wherein the database further comprises each of a plurality of network data, a plurality of resource library data and a plurality of user discussion data, wherein the plurality of network data corresponds to a plurality of hierarchical networks, wherein the plurality of resource library data corresponds to a plurality of repositories corresponding to the plurality of hierarchical networks, wherein the plurality of hierarchical networks is associated with a plurality of discussions, wherein the plurality of user discussion data corresponds to the plurality of discussions.

17. The system of claim 16, wherein the communication device is further configured for receiving a conflict result data from the user device associated with a user, wherein the user is associated with a leadership role, wherein the conflict result data corresponds to a result of a conflict between the plurality of hierarchical networks, wherein the conflict result data is based on at least one of the plurality of user discussion data and the plurality of resource library data associated with the plurality of hierarchical networks, wherein the processing device is further configured for storing the conflict result data in the database.

18. The system of claim 10, wherein the processing device is further configured for:

generating a network catalog data based on the network data, wherein the network catalog data corresponds to a catalog of the hierarchical network; and storing the network catalog data in the database.

* * * * *